United States Patent
Sawada et al.

(10) Patent No.: US 9,405,160 B2
(45) Date of Patent: Aug. 2, 2016

(54) ACTIVE MATRIX SUBSTRATE AND LIQUID CRYSTAL DISPLAY DEVICE

(75) Inventors: Hironobu Sawada, Osaka (JP); Junichi Morinaga, Osaka (JP); Kuniko Maeno, Osaka (JP); Katsushige Asada, Osaka (JP); Katsuhiro Mikumo, Osaka (JP); Tetsuya Fujikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 309 days.

(21) Appl. No.: 13/643,379

(22) PCT Filed: Jan. 25, 2011

(86) PCT No.: PCT/JP2011/051316
§ 371 (c)(1),
(2), (4) Date: Oct. 25, 2012

(87) PCT Pub. No.: WO2011/148664
PCT Pub. Date: Dec. 1, 2011

(65) Prior Publication Data
US 2013/0038807 A1    Feb. 14, 2013

(30) Foreign Application Priority Data
May 24, 2010   (JP) .................... 2010-118734

(51) Int. Cl.
*G02F 1/1362*    (2006.01)
*G02F 1/1337*    (2006.01)
(Continued)

(52) U.S. Cl.
CPC .... *G02F 1/136286* (2013.01); *G02F 1/133707* (2013.01); *G02F 2001/13606* (2013.01); *G02F 2001/134345* (2013.01)

(58) Field of Classification Search
CPC .............. H01L 27/124; H01L 27/3276; H01L 29/41775; H01L 27/14603; H01L 27/3244; G09G 3/3614; G09G 2300/0426; G09G 2320/0247; G09G 2320/0223; G09G 3/3666; G09G 2310/0224; G09G 2300/0823; G09G 2310/0281; G09G 3/3648; G09G 3/3688; G09G 2310/0202; G02F 1/136298; G02F 1/134309; G02F 2001/134345; G02F 2001/13606; G02F 2001/136295
USPC ........ 349/37, 43, 139, 144, 145, 146; 257/59, 257/72, E33.064, E33.065, E29.112, 257/E29.116, E29.117, E29.1, 18, E29.122, 257/E29.182; 345/204, 690, 209, 55, 92, 96
See application file for complete search history.

(56) References Cited

U.S. PATENT DOCUMENTS 6,147,722 A    11/2000   Shimada et al.
6,603,524 B1 *  8/2003   Shimada et al. ............. 349/139
(Continued)

FOREIGN PATENT DOCUMENTS

JP    10-104664 A    4/1998
JP    2004-004875 A  1/2004
(Continued)

OTHER PUBLICATIONS

Official Communication issued in International Patent Application No. PCT/JP2011/051316, mailed on Apr. 26, 2011.

*Primary Examiner* — Michael Caley
*Assistant Examiner* — Angela Davison
(74) *Attorney, Agent, or Firm* — Keating & Bennett, LLP

(57) ABSTRACT

An active matrix substrate includes a plurality of pixel electrodes arranged in a matrix; and a source wiring running in a column direction, wherein the source wiring includes a first side portion running along one side in a column direction of at least one pixel electrode of the plurality of pixel electrodes, a crossing portion running across the pixel electrode, and a second side portion running along another side in the column direction of the pixel electrode, the first side portion and the second side portion are connected to each other via the crossing portion, and at least one crossing portion is provided on each of at least two pixel electrodes aligned in the column direction out of the plurality of pixel electrodes.

19 Claims, 22 Drawing Sheets

(51) Int. Cl.
*G02F 1/1343* (2006.01)
*G02F 1/136* (2006.01)

(56) References Cited

U.S. PATENT DOCUMENTS

| | | | |
|---|---|---|---|
| 7,436,479 | B2 | 10/2008 | Park et al. |
| 2004/0017521 | A1 | 1/2004 | Okada et al. |
| 2004/0227894 | A1 | 11/2004 | Kim et al. |
| 2006/0279682 | A1 | 12/2006 | Kim et al. |
| 2006/0285049 | A1 | 12/2006 | Kim et al. |
| 2007/0109482 | A1* | 5/2007 | Kim ............................ 349/144 |
| 2007/0211201 | A1 | 9/2007 | Park et al. |
| 2007/0296879 | A1 | 12/2007 | Lin |
| 2008/0136759 | A1* | 6/2008 | Kim ............................ 345/87 |
| 2009/0095958 | A1* | 4/2009 | Inoue et al. ................. 257/66 |
| 2010/0009479 | A1 | 1/2010 | Kim et al. |
| 2010/0277447 | A1 | 11/2010 | Itoh et al. |
| 2011/0069259 | A1 | 3/2011 | Kim |

FOREIGN PATENT DOCUMENTS

| | | |
|---|---|---|
| JP | 2004-310105 A | 11/2004 |
| JP | 2008-003557 A1 | 1/2008 |
| KR | 20080053644 A | 6/2008 |

\* cited by examiner

ACTIVE MATRIX SUBSTRATE AND LIQUID CRYSTAL DISPLAY DEVICE

TECHNICAL FIELD

The present invention relates to an active matrix substrate and a liquid crystal display device. More specifically, the present invention relates to an active matrix substrate and a liquid crystal display device which are suitably used in the case of polarity inversion driving.

BACKGROUND ART

Liquid crystal display devices are now widely used in a variety of fields such as TVs, PCs, mobile phones, and digital cameras owing to their advantageous features such as thin profile, light weight, and low power consumption. According to a liquid crystal display system, optical properties (e.g. birefringence, optical rotation, dichroism, optical rotatory dispersion) associated with molecular sequence alteration of liquid crystals due to voltage application is utilized to control light used for display. In accordance with methods for controlling liquid crystals, the system is further divided into many modes. For example, in a matrix display mode, electrodes are arranged in a specific pattern and driving thereof are individually controlled, which allows high-definition display.

The matrix display mode is further divided into passive matrix type and active matrix type. In an active matrix display, electrodes are arranged in a matrix and a plurality of wirings are running in the row direction and the column direction to surround the electrodes. A switching element is provided for each intersection of the wirings. In such a display device, driving of the electrodes is individually controlled by the plurality of wirings, so that high-definition liquid crystal display is realized even if it contains a large-volume image data.

Studies have been conventionally made on wiring patterns of such an active matrix liquid crystal display device for the purpose of improving the display quality. For example, in liquid crystal display devices disclosed in Patent Literatures 1 to 7, signal lines (data lines, source wirings) are not running straight but are partially bended.

For example, in a liquid crystal display device disclosed in Patent Literature 1, pixel electrodes or signal wirings have bent portions and each bent portion serves as a boundary dividing the adjacent pixel electrodes each into two parts. The divided parts of the adjacent pixel electrodes are respectively covered. Accordingly, bending of pixel electrodes or signal wirings suppresses variation in capacitance generated between the pixel electrode and the signal wiring (source wiring) due to an alignment shift between layers, even in the case of dot inversion driving in which the polarity of the source signal is reversed for each gate line.

In a liquid crystal display device disclosed in Patent Literature 2, a storage capacitor wiring and/or gate wiring is partially extended to shade a clearance between two pixel electrodes adjacent to each other in the row direction which is formed by bending of a signal wiring (source wiring). This suppresses a light leakage caused between the adjacent pixel electrodes, so that the contrast ratio of black and white presentation is improved.

CITATION LIST

Patent Literature
Patent Literature 1: JP-A 2001-281682
Patent Literature 2: WO 2009/104346
Patent Literature 3: JP-A 2008-3557
Patent Literature 4: JP-A 2004-310105
Patent Literature 5: JP-A 10-104664
Patent Literature 6: U.S. Pat. No. 7,436,479
Patent Literature 7: JP-A 2004-4875

SUMMARY OF INVENTION

Technical Problem

Electrodes and wirings in liquid crystal display devices are formed, for example, by first forming a conductive film on the entire substrate surface by sputtering and then patterning the conductive film into a desired shape by photolithography. It is to be noted that, in the case of exposure to a large screen panel, a mask (lens) relay needs to be carried out on the occasion of exposure via a photomask. If the alignment is not accurate before and after the mask relay is carried out, a positional shift may be caused between the pixel electrodes.

FIGS. 26 and 27 are schematic plan views each illustrating a positional relationship between source wirings and a pixel electrode when an alignment shift is present in the exposure range. FIG. 26 illustrates a case where the alignment of the pixel electrode is shifted to the left. FIG. 27 illustrates a case where the alignment of the pixel electrode is shifted to the right. In the case where pixel electrodes 111 and 121 are arranged in a matrix, source wirings 112 and 122 are positioned to overlap with a clearance between the pixel electrodes 111 and 121 as illustrated in FIGS. 26 and 27. Especially, the aperture ratio is increased in the case of providing source wirings 112 and 122 in a layer and pixel electrodes 111 and 121 in another layer via an insulating film in such a manner that they are partially overlapped with each other, compared to the case where pixel electrodes and source wirings are provided in the same layer and a specific interval is kept between them to avoid conduction therebetween. In this case, a specific magnitude of parasitic capacitance is generated in a region where the source wirings 112 and 122 are overlapped with the pixel electrodes 111 and 121 via an insulating film. The volume of the parasitic capacitance is proportional to the overlapping area.

In the case where the layer including the source wirings 112 and 122 and the layer including the pixel electrodes 111 and 121 are different, however, if the mask (lens) relay is not accurately carried out, the alignment shift may be caused between the source wirings 112 and 122 and the pixel electrodes 111 and 121 as illustrated in FIGS. 26 and 27. In such a case, the overlapping area between the pixel electrode 111 and a source wiring 112a formed along one side of the pixel electrode 111 is different from the overlapping area between the pixel electrode 121 and a source wiring 122a formed along one side of the pixel electrode 121. Similarly, the overlapping area between the pixel electrode 111 and a source wiring 112b formed along the other side of the pixel electrode 111 is different from the overlapping area between the pixel electrode 121 and a source wiring 122b formed along the other side of the pixel electrode 121.

When the overlapping area between the source wiring and the pixel electrode varies among the pixels as above, the following problems may be caused, for example, in the case of the driving system in which the adjacent pixel electrodes are of different polarity. A description is given on the case where a wiring for supplying a signal for writing into the pixel electrode is arranged in such a manner as to overlap with the left side of the pixel electrode in FIGS. 26 and 27. Hereinafter, the source wirings 112a and 122a respectively overlapping with the left sides of the pixel electrodes 111 and 121 are also referred to as "self-pixel source wirings", and the source wirings 112b and 122b respectively overlapping with the right sides of the pixel electrodes 111 and 121 are also referred to as "next-pixel source wirings".

The parasitic capacitance formed between the pixel electrodes 111 and 121 and the self-pixel source wirings 112a and 122a is defined as Csd1. The parasitic capacitance formed between the pixel electrodes 111 and 121 and the self-pixel source wirings 112b and 122b is defined as Csd2. The value indicated by Csd1−Csd2 is different between the case where the alignment shift as illustrated in FIG. 26 is present and the case where the alignment shift as illustrated in FIG. 27 is present. The electric potential for writing into each pixel electrode fluctuates in accordance with the volume of the parasitic capacitance. Therefore, the pixel potential fluctuating in accordance with the volume of Csd1 and Csd2 is different between the pixel electrode in FIG. 26 and the pixel electrode in FIG. 27, even if the same effective potential for writing is applied. As a result, the effective voltage to be applied between the liquid crystal layers varies for each pixel electrode.

Such a difference in the effective voltage causes unevenness of brightness in a display device, which is visually recognizable as block unevenness in the display region.

The present invention has been devised in consideration of the state of the art, and aims to provide an active matrix substrate that enables to suppress variation in the pixel potential even if an alignment shift is present, and a liquid crystal display device in which deterioration in the display quality due to variation in the pixel potential is suppressed without lowering in the aperture ratio.

Solution to Problem

The present inventors have intensively studied about how to adjust the balance of the area of a region where the source wiring is partially bent to overlap with the pixel electrode. Use of the method disclosed in Patent Literature 2 which features how to bend the source wiring enables to suppress deterioration in the display quality due to variation in the parasitic capacitance. The aperture ratio is however lowered because the source wiring is mostly formed in the aperture region.

The present inventors have studied about how to bend the source wiring and found out the following method can suppress lowering of the aperture ratio as well as variation in the electric potential for writing between the pixel electrodes. Namely, the bent portion of the source wiring is positioned to cross the pixel electrode, not to cross the clearance between the pixel electrodes adjacent to each other in the row direction. The other portion of the source wiring is positioned to overlap with a clearance between the pixel electrodes adjacent to each other in the row direction.

More specifically, a crossing portion across the pixel electrode in the row direction is provided, so that one source wiring running in the column direction is arranged along both sides of each pixel electrode in the column direction. This arrangement suppresses variation in the electric potential for writing between the pixel electrodes adjacent to each other in the row direction, even if the alignment shift in the row direction is present and the degree of the alignment shift varies among the pixel electrodes or among the source wirings. The reason for this effect is that both the self-pixel source wiring and the next-pixel source wiring overlap with one side of the pixel electrode. In addition, most part of the source wiring overlaps with the clearance between the pixel electrodes adjacent to each other in the row direction, so that lowering of the aperture ratio is suppressed. Since the crossing portion is provided to overlap with the pixel electrode itself not with the clearance between the pixel electrodes adjacent to each other in the column direction, variation in the electric potential for writing is less likely to be caused between the pixels adjacent to each other in the column direction, even if an alignment shift is generated in the column direction.

Accordingly, the present inventors have solved the above problem and completed the present invention.

Namely, the present invention is an active matrix substrate including: a plurality of pixel electrodes arranged in a matrix; and a source wiring running in a column direction, wherein the source wiring has a first side portion running along one side in a column direction of at least one pixel electrode of the plurality of pixel electrodes, a crossing portion running across the pixel electrode, and a second side portion running along another side in the column direction of the pixel electrode, the first side portion and the second side portion are connected to each other via the crossing portion, and at least one crossing portion is provided on each of at least two pixel electrodes aligned in the column direction out of the plurality of pixel electrodes.

The active matrix substrate of the present invention includes a plurality of pixel electrodes arranged in a matrix and a source wiring running in a column direction. The source wiring is for supplying a data signal (electric potential for writing) to the pixel electrode. The pixel electrode is charged in accordance with the magnitude of the electric potential for writing supplied from the source wiring.

The source wiring has a first side portion running along one side in a column direction of at least one pixel electrode of the plurality of pixel electrodes, a crossing portion running across the pixel electrode, and a second side portion running along another side in the column direction of the pixel electrode. The first side portion and the second side portion are connected to each other via the crossing portion. At least one crossing portion is provided on each of at least two pixel electrodes aligned in the column direction out of the plurality of pixel electrodes. Formation of the source wiring partially along the side of the pixel electrode prevents a light leakage in the clearance between the pixel electrodes adjacent to each other in the row direction, so that the contrast ratio is increased. In such a configuration, a single source wiring has two portions along the sides of the pixel electrodes and the portion crossing the pixel electrode for each pixel electrode, so as to provide an active matrix substrate that is resistant to both of the alignment shifts in the row direction and in the column direction and is less likely to have lowering in the aperture ratio.

The configuration of the active matrix substrate of the present invention is not especially limited as long as it essentially includes such components. The active matrix substrate may or may not include other components. Preferable embodiments of the active matrix substrate of the present invention are mentioned in more detail below.

Two pixel electrodes adjacent to each other in the row direction among pixel electrodes aligned in the row direction out of the plurality of pixel electrodes are preferably of opposite polarity. This prevents flicker, image sticking, and the like in the display when the active matrix substrate of the present invention is used in a display device. In addition, since features of the active matrix substrate of the present invention has solved a problem in polarity inversion, that is, a problem that alignment shift causes variation in the parasitic capacitance among the pixel electrodes aligned in the row direction, the active matrix substrate of the present invention is particularly suitably used.

Two pixel electrodes adjacent to each other in the column direction among pixel electrodes aligned in the column direction out of the plurality of pixel electrodes are preferably of opposite polarity. This prevents flicker, image sticking, and the like in the display when the active matrix substrate of the present invention is used in a display device. In addition, since the features of the active matrix substrate of the present invention has solved the problem in polarity inversion in which alignment shift causes variation in the parasitic capacitance among the pixel electrodes aligned in the row direction, the active matrix substrate of the present invention is particularly suitably used.

Preferably, the at least two pixel electrodes aligned in the column direction includes a pair of pixel electrodes adjacent to each other, the two pixel electrodes include a first pixel electrode and a second pixel electrode, and the source wiring has the second side portion running along one side of the first pixel electrode in the column direction and the first side portion running along one side of the second pixel electrode in the column direction connected to each other not via the crossing portion across the pixel electrode. Preferably, the at least two pixel electrodes aligned in the column direction includes a pair of pixel electrodes adjacent to each other, the two pixel electrodes include a first pixel electrode and a second pixel electrode, and the source wiring has the first side portion running along one side of the first pixel electrode in the column direction and the second side portion running along one side of the second pixel electrode in the column direction connected to each other not via the crossing portion across the pixel electrode. The bent pattern of the source wiring repeated in every two pixel electrodes hardly causes variation in the pixel potential between two pixel electrodes adjacent to each other in the column direction, and minimizes the number of crossing portions. As a result, the pattern is less likely to be complicated so that the yield rate is increased.

One crossing portion is preferably provided on each of the at least two pixel electrodes adjacent to each other in the column direction out of the plurality of pixel electrodes. Essential components of the present invention includes at least one first side portion, at least one second side portion, and at least one crossing portion connecting the first side portion and the second side portion. Providing one crossing portion for each of the pixel electrodes aligned in the column direction realizes volume reduction as well as minimization of lowering of the aperture ratio.

An even number of crossing portions are preferably provided on each of at least two pixel electrodes adjacent to each other in the column direction out of the plurality of pixel electrodes. Essential components of the present invention includes at least one first side portion, at least one second side portion, and at least one crossing portion connecting the first side portion and the second side portion. An even number of crossing portions do not require change in patterns of components formed in the pixels aligned in the column direction, such as electrodes, wirings, and thin film transistors, so that the same patterns can be formed in all the pixels. Accordingly, fluctuation in the parameter of the pixel potential and variation in the alignment of liquid crystal molecules when used in a liquid crystal display device are more likely to be suppressed.

Preferably, the crossing portion substantially equally divide a side of the pixel electrode in the column direction. This configuration equalizes the length of the first side portion and the length of the second side portion of the source wiring, and therefore, variation in the pixel potential is more likely to be suppressed.

The crossing portion is preferably formed of a transparent electrode. Wirings are commonly suitably formed of aluminum, copper, chromium, titanium, tantalum, molybdenum, or the like, which has a low specific resistance. In terms of high aperture ratio, however, translucent materials such as Indium Tin Oxide (ITO) and Indium Zinc Oxide (IZO) are suitably used. In the present embodiment, since the crossing portion is formed of a translucent material, a higher aperture ratio is achieved. In addition, if side portions of the source wiring are formed of the material having a low specific resistance, sufficient conductivity is achieved to hardly cause wiring delay.

In the present invention, the at least one pixel electrode preferably has a substantially rectangular shape, substantially V shape, or substantially W shape.

The first side portion is preferably divided into two branches at a branch point, and the branches respectively overlaps with the pixel electrodes adjacent to each other in the row direction. The second side portion is preferably divided into two branches at a branch point, and the branches respectively overlaps with the pixel electrodes adjacent to each other in the row direction. Branch points are provided in the first and/or the second side portion of the source wiring, and hoop-shaped parts are formed in the source wiring. The source wiring has a ladder shape as a whole. In such a configuration, even if an alignment shift is generated in the row direction, each branched side portion is less likely to overlap with a clearance between the pixel electrodes adjacent to each other in the row direction. Accordingly, variation in the pixel potential is more likely to be suppressed between the pixel electrodes adjacent to each other.

Preferably, the active matrix substrate further has a gate wiring running in the row direction, and the gate wiring is across the pixel electrode. If the gate wiring is provided to overlap with the pixel electrode, it is not necessary to shade the region where misalignment of liquid crystal molecules is caused by a gate field. In such a case, the pattern is simplified to contribute to the improvement in the yield rate. If an alignment shift is generated in the column direction, variation in the parasitic capacitance between the pixel electrode and the gate wiring is suppressed more and fluctuation in the pixel potential is also suppressed more, compared to the case where the gate wiring is provided to overlap with a clearance between the pixel electrodes adjacent to each other in the column direction.

Preferably, the active matrix substrate further has a gate wiring running in the row direction, and the gate wiring is formed to overlap with a clearance between the pixel electrodes adjacent to each other in the column direction. Providing the gate wiring to overlap with a clearance between the pixel electrodes adjacent to each other in the column direction can prevent a light leakage in the clearance between the pixel electrodes adjacent to each other in the column direction when used in a liquid crystal display device, so that the contrast ratio is increased.

Preferably, the active matrix substrate further has a thin film transistor connected to the source wiring and the gate wiring, and the thin film transistor overlaps with a bisector of a side of the pixel electrode in the row direction. Arrangement of a TFT (Thin Film Transistor) in this manner facilitates equalization of the pattern of the pixel electrode in the even rows and in the odd rows around the TFT. As a result, fluctuation in the parameter of the pixel potential due to difference in the shape of the pixel electrode is less likely to be caused.

The present invention also is a liquid crystal display device including the active matrix substrate described above, a liquid crystal layer, and a counter substrate stacked in the stated order. The configuration of the active matrix substrate of the present invention suppresses lowering of the aperture ratio and variation in the pixel potential, realizing high-quality display.

Examples of alignment modes of liquid crystals preferably used in the liquid crystal display device of the present invention include TN (Twisted Nematic) mode, VA (Vertical Alignment) mode, IPS (In-plane Switching) mode, TBA (Transverse Bend Alignment) mode, CPA (Continuous Pinwheel Alignment) mode, and MVA (Multi-domain Vertical Alignment) mode.

Advantageous Effects of Invention

The active matrix substrate of the present invention can suppress variation in the pixel potential. The liquid crystal display device of the present invention can suppress lowering of the aperture ratio as well as variation in the pixel potential, so that high-quality display is realized.

BRIEF DESCRIPTION OF DRAWINGS

FIG. 3-1 is a schematic plan view illustrating the polarity of the pixel electrodes provided in the liquid crystal display device of Embodiment 1 in a mode of line inversion driving in which the polarity is switched between the adjacent columns.

FIG. 3-2 is a schematic plan view illustrating the polarity of the pixel electrodes provided in the liquid crystal display device of Embodiment 1 in a mode of line inversion driving in which the polarity is switched between the adjacent rows.

DESCRIPTION OF EMBODIMENTS

Figure 1:
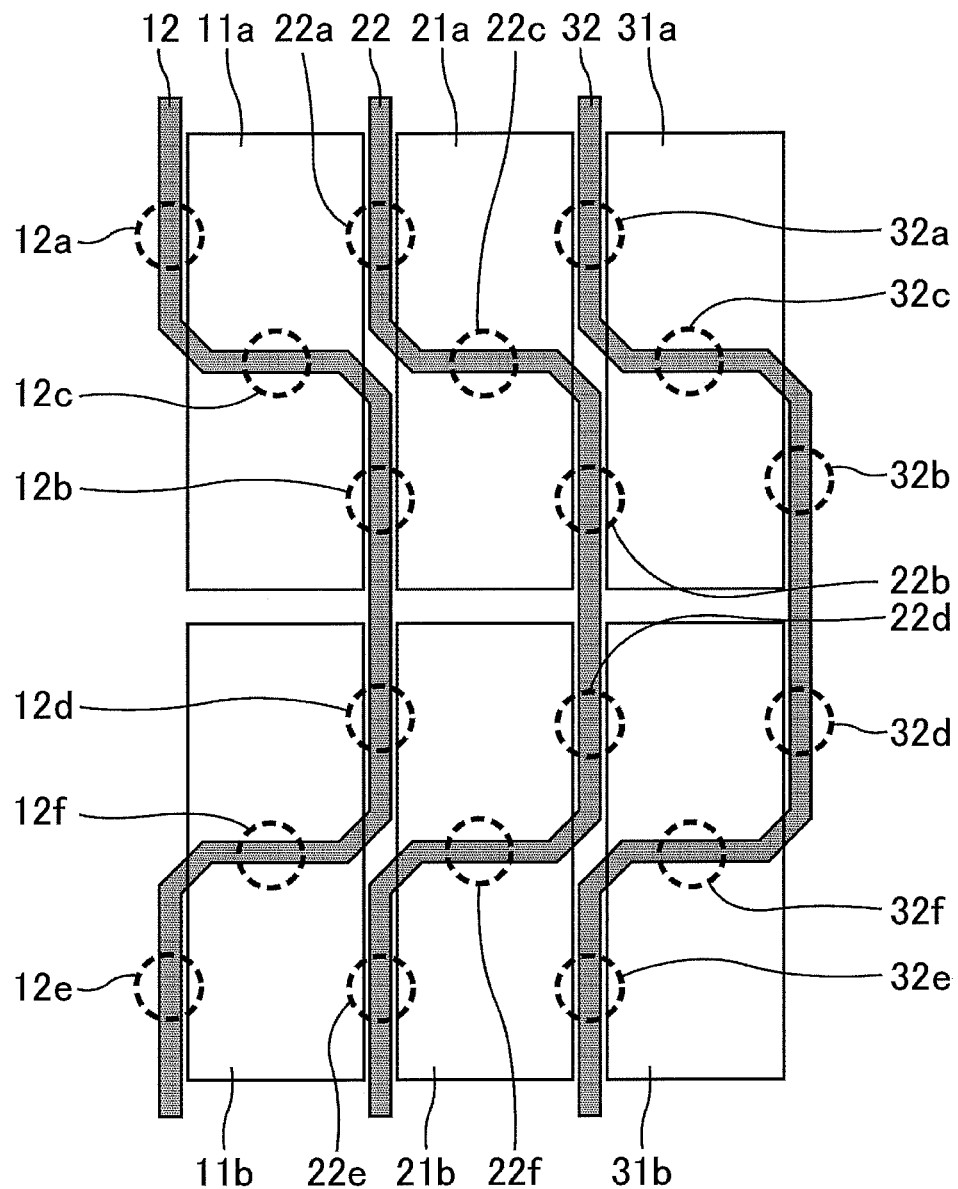
FIG. 1 is a schematic plan view illustrating a positional relationship between pixel electrodes and source wirings in an active matrix substrate provided in a liquid crystal display device of Embodiment 1.

The present invention will be mentioned in more detail referring to the drawings in the following embodiments, but is not limited to these embodiments.

Here, in the case where the shape is described using "substantially", the object virtually has the described shape. For example, a "substantially rectangular shape" means a virtually rectangular shape as a whole, and a partial protrusion or notch may be formed therein.

The word "pixel" herein refers to a range corresponding to one pixel electrode.

Embodiment 1

Embodiment 1 is one example of the liquid crystal display device of the present invention in which the active matrix substrate of the present invention is used. The liquid crystal display device of Embodiment 1 has an active matrix substrate provided with pixel electrodes, TFTs, and the like.

The active matrix substrate in Embodiment 1 has a glass substrate as a base. On the glass substrate, a plurality of pixel electrodes are aligned in the row direction and in the column direction in a matrix as a whole. This configuration enables alignment control of liquid crystal molecules in each pixel electrode.

FIG. 1 is a schematic plan view illustrating a positional relationship between pixel electrodes and source wirings in the active matrix substrate provided in a liquid crystal display device of Embodiment 1. In Embodiment 1, pixel electrodes 11a, 11b, 21a, 21b, 31a, and 31b each have a rectangular shape. In Embodiment 1, source wirings 12, 22, and 32 are each formed to overlap partially with a clearance between two pixel electrodes adjacent to each other in the row direction. The source wirings 12, 22, and 32 each have bent portions. From the bent portions, crossing portions are respectively formed so as to cross the pixel electrodes 11a, 11b, 21a, 21b, 31a, and 31b. Accordingly, the source wirings 12, 22, 32 each have a zigzag shape as a whole. More specifically, for example, the first source wiring 12 has first side portions 12a and 12d respectively running in the column direction along one side of the pixel electrodes 11a and 11b, second side portions 12b and 12e respectively running in the column direction along the other side of the pixel electrodes 11a and 11b, and crossing portions 12c and 12f respectively connecting the first side portions 12a and 12d with the second side portions 12b and 12e. One each of these portions is provided in each of the pixel electrodes 11a and 11b. Crossing portions 12c and 12f are each formed at a position overlapping with a bisector of one side in the column direction of each of the pixel electrode 11a and 11b. The total length of the first side portions and the total length of the second side portions are substantially the same. Also in the second source wiring 22 and the third source wiring 32, first side portions 22a, 32a, 22d, and 32d, second side portions 22b, 22e, 32b, and 32e, and crossing portions 22c, 22f, 32c, and 32f are formed in the same pattern.

The pixel electrodes 11a, 11b, 21a, 21b, 31a, and 31b are formed in a layer different from a layer where the source wirings 12, 22, and 32 are formed via an insulating film. Though not illustrated in FIG. 1, the pixel electrode may partially overlap with the side portions of the source wiring. Such a configuration prevents a light leakage between the pixel electrodes, so that the contrast ratio is increased. As a result, a parasitic capacitance is formed between the pixel electrode and the source wiring.

The arrangement of the source wirings in Embodiment 1 is advantageous especially in the case where the pixel electrodes adjacent to each other in the row direction are of different polarity. Commonly, in the case where two pixel electrodes adjacent to each other in the row direction are of different polarity and the overlapping area between the pixel electrode and the source wiring varies for each pixel electrode, the magnitude of the parasitic capacitance formed between the source wirings varies for each pixel electrode. As a result, the voltage held in the pixel electrode may vary.

In the arrangement of the source wirings of Embodiment 1, however, even if an alignment shift is caused between the source wirings or between the pixel electrodes in the row direction, the distance between an edge of one pixel electrode and the source wiring adjacent to the edge is almost the same between the source wiring (self-pixel source wiring) overlapping with the left side of the pixel electrode and the source wiring (next-pixel source wiring) overlapping with the right side of the pixel electrode. Alternatively, a plurality of source wirings overlaps with one pixel electrode, and the overlapping area is almost the same between the source wiring (self-pixel source wiring) overlapping with the left side of the pixel electrode and the source wiring (next-pixel source wiring) overlapping with the right side of the pixel electrode. Accordingly, the value indicated by Csd1−Csd2 (the value obtained by subtracting parasitic capacitance Csd2 formed between the pixel electrode and the next-pixel source wiring from parasitic capacitance Csd1 formed between the pixel electrode and the self-pixel source wiring) is the same in respective pixels. The magnitude of the potential that fluctuates by an influence from the source wirings 12, 22, and 32 is not so different among the pixel electrodes. Accordingly, the pixel potential hardly fluctuates among the pixel electrodes 11a, 21a, and 31a adjacent to each other in the row direction or among the pixel electrodes 11b, 21b, and 31b adjacent to each other in the row direction.

More specifically, in the case where the pixel electrode 21a in FIG. 1 is shifted to the right, for example, the value of Csd1 (parasitic capacitance) formed between the first side portion 22a of the second source wiring 22 and the pixel electrode 21a is small, and the value of Csd1 formed between the second side portion 22b of the second source wiring 22 and the pixel electrode 21a is large. Moreover, the value of Csd2 formed between the second side portion 12b of the first source wiring 12 and the pixel electrode 21a is small, and the value of Csd2 formed between the first side portion 32a of the third source wiring 32 and the pixel electrode 21a is large. In the case of dot inversion driving, a signal voltage supplied from the first source wiring 12 and a signal voltage supplied from the third source wiring 32 are of the same polarity. Accordingly, in a unit of a single pixel electrode 21a, the total value of Csd1s and the total value of Csd2s are equalized.

Similarly, in the case where the pixel electrode 21a is shifted to the left, the value of Csd1 (parasitic capacitance) formed between the first side portion 22a of the second source wiring 22 and the pixel electrode 21a is large, and the value of Csd1 formed between the second side portion 22b of the second source wiring 22 and the pixel electrode 21a is small. Moreover, the value of Csd2 formed between the second side portion 12b of the first source wiring 12 and the pixel electrode 21a is large, and the value of Csd2 formed between the first side portion 32a of the third source wiring 32 and the pixel electrode 21a is small. In the case of dot inversion driving, a signal voltage supplied from the first source wiring 12 and a signal voltage supplied from the third source wiring 32 are of the same polarity. Accordingly, in a unit of a single pixel electrode 21a, the total value of Csd1s and the total value of Csd2s are equalized.

Accordingly, in Embodiment 1, in either case where the pixel electrode 21a is shifted to the right or to the left, the value of Csd1 and the value of Csd2 are adjusted to be equalized. Accordingly, even if the alignment is shifted to the right or to the left, the pixel potential hardly fluctuates.

In Embodiment 1, the source wirings are not provided to overlap with a clearance between two pixel electrodes 11a and 11b, between the pixel electrodes 21a and 21b, or between the pixel electrodes 31a and 31b adjacent to each other in the column direction. Accordingly, even if the alignment is shifted in the column direction, the pixel potential is less likely to fluctuate between two pixel electrodes 11a and 11b, 21a and 21b, or 31a and 31b adjacent to each other in the column direction.

According to Embodiment 1, even if the alignments of pixel electrodes and source wirings are shifted to any directions, the pixel potential is less likely to fluctuate, so that excellent display quality is achieved.

Figure 2:
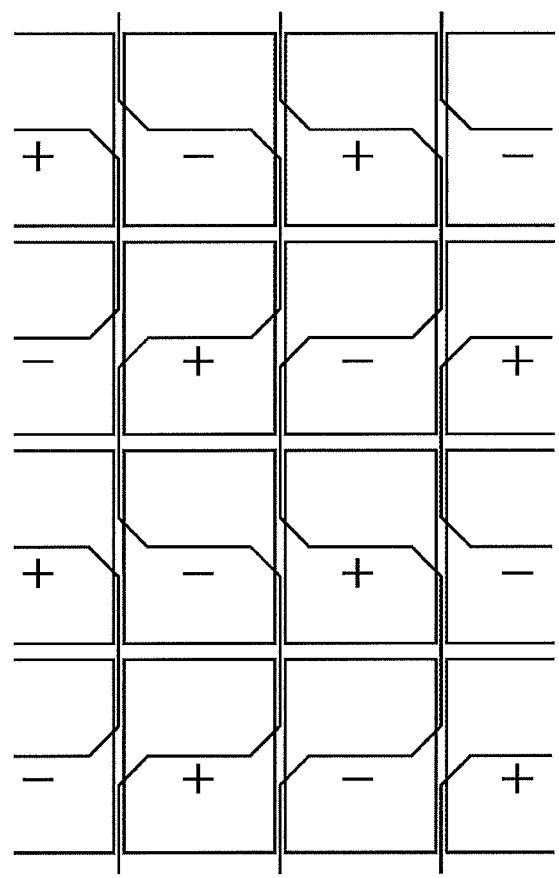
FIG. 2 is a schematic plan view illustrating the polarity of the pixel electrodes provided in the liquid crystal display device of Embodiment 1 in a mode of dot inversion driving.
Figures 1, 3:
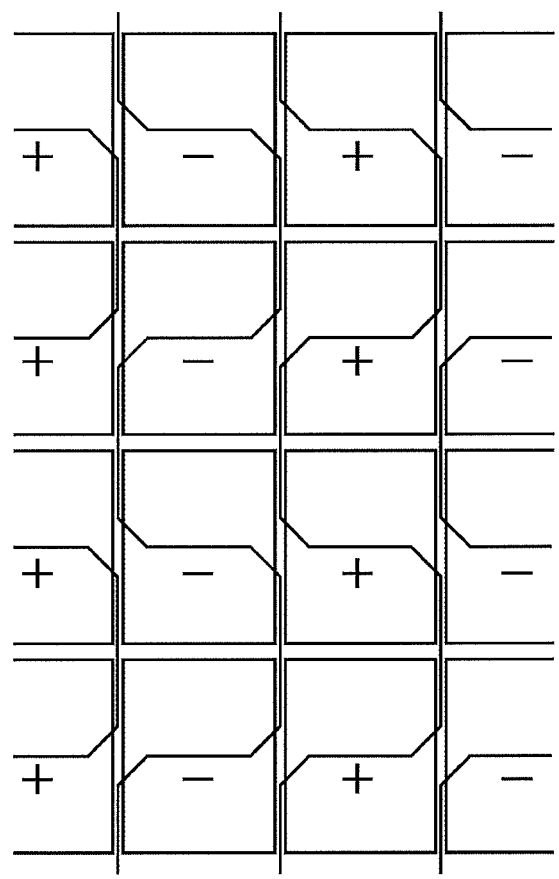
Figures 2, 3:
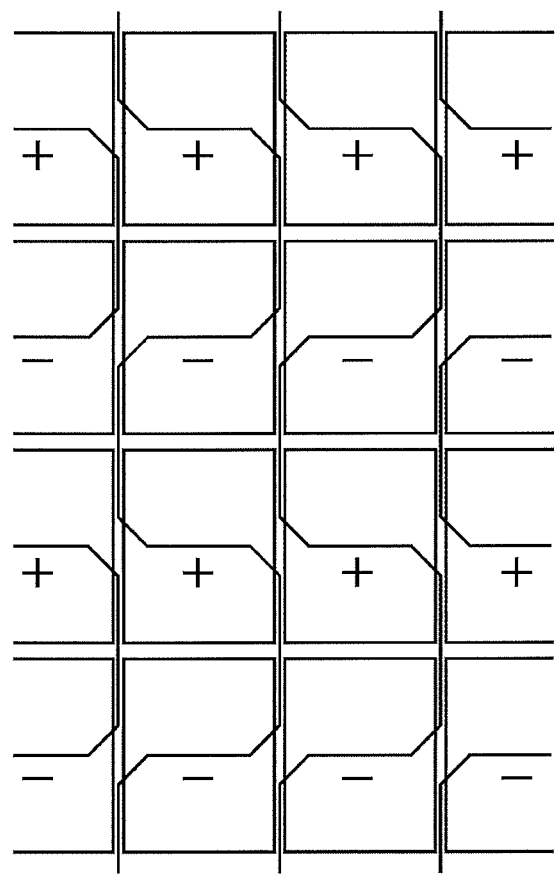
Figure 4:
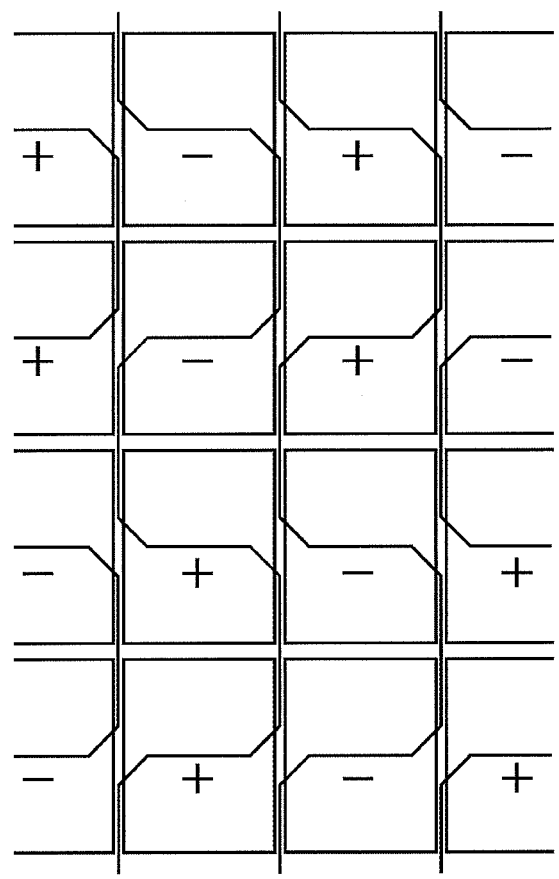
FIG. 4 is a schematic plan view illustrating the polarity of the pixel electrodes provided in the liquid crystal display device of Embodiment 1 in a mode of 2H dot inversion driving.

FIGS. 2 to 4 are schematic plan views each illustrating the polarity of the pixel electrodes provided in the liquid crystal display device of Embodiment 1 in a mode of dot inversion driving. FIG. 2 illustrates a case of dot inversion driving. FIG. 3-1 illustrates a case of line inversion driving in which the polarity is switched between the adjacent columns. FIG. 3-2 illustrates a case of line inversion driving in which the polarity is switched between the adjacent rows. FIG. 4 illustrates a case of 2H dot inversion driving. A driving method of the pixel electrode in Embodiment 1 may be, for example, dot inversion driving. In the dot inversion driving, DC (direct current) drive is employed for the potential (Com potential) of the electrode provided in a counter substrate positioned to sandwich the liquid crystal layer with the active matrix substrate, AC (alternating current) drive is employed for the source signal in the active matrix substrate, and the polarity of the signal to be applied to each pixel electrode is reversed to form a checkerboard pattern. Accordingly, the pixel electrodes in Embodiment 1 are arranged in such a manner that the polarity is alternately reversed (in the order of "+, −, +, −") in both the row direction and the column direction as illustrated in FIG. 2. Such polarity can be changed by using a source driver connected to the source wiring. The dot inversion driving can effectively suppress occurrence of flicker. In Embodiment 1, line inversion driving may also be employed in which the polarity of the signal to be applied to the pixel electrode is alternately reversed only in one of the row direction and the column direction, as illustrated in FIGS. 3-1 and 3-2. As illustrated in FIG. 4, 2H dot inversion driving (e.g. +, +, −, −) may be employed in which the polarity is reversed for every two pixels in the column direction and for each pixel in the row direction.

The configuration of Embodiment 1 enables to keep the display quality even in the case where the adjacent pixel electrodes 11 are of different polarity. Accordingly, occurrence of flicker is suppressed and unevenness of brightness due to difference in brightness between the adjacent pixel electrodes is prevented. Moreover, a light leakage in a clearance among the pixel electrodes 11a, 21a, and 31a or pixel electrodes 11b, 21b, and 31b is prevented so that the contrast ratio is increased, realizing high-quality display.

Figure 5:
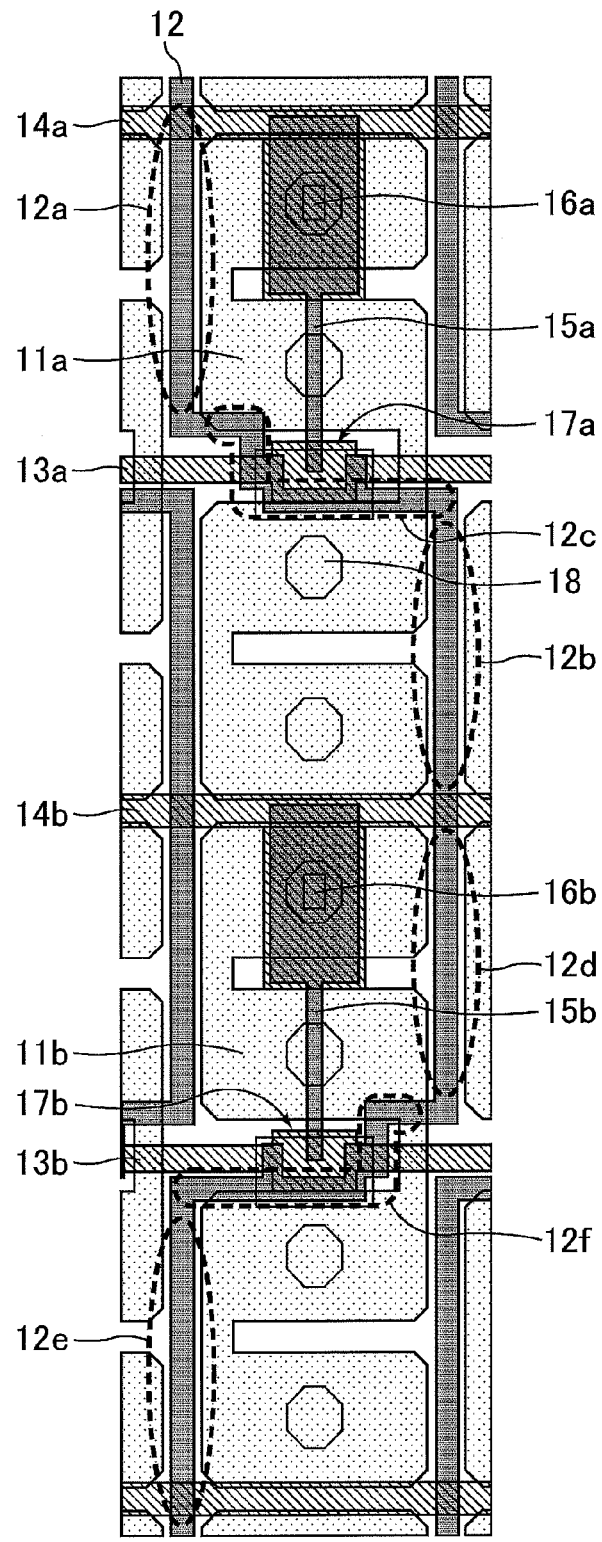
FIG. 5 is a schematic plan view illustrating one example (Example 1) of the active matrix substrate provided in the liquid crystal display device of Embodiment 1.
Figure 6:
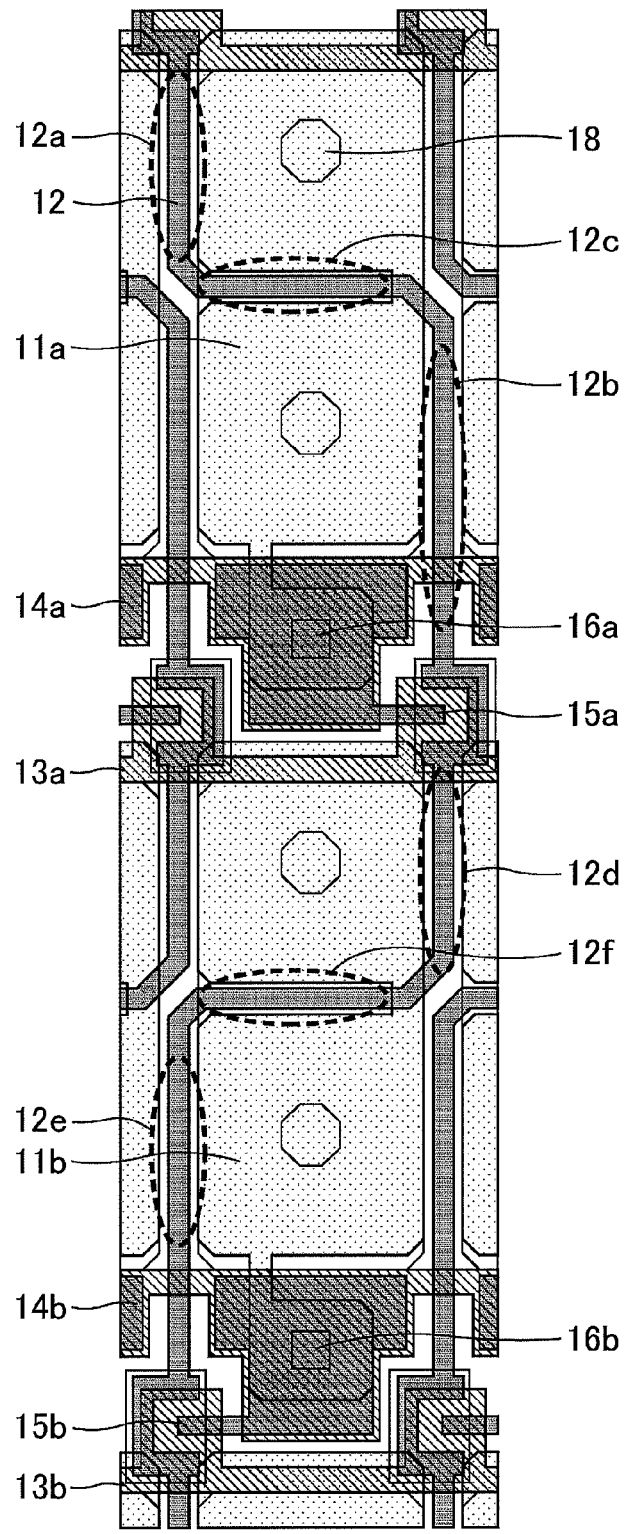
FIG. 6 is a schematic plan view illustrating one example (Example 2) of the active matrix substrate provided in the liquid crystal display device of Embodiment 1.
Figure 7:
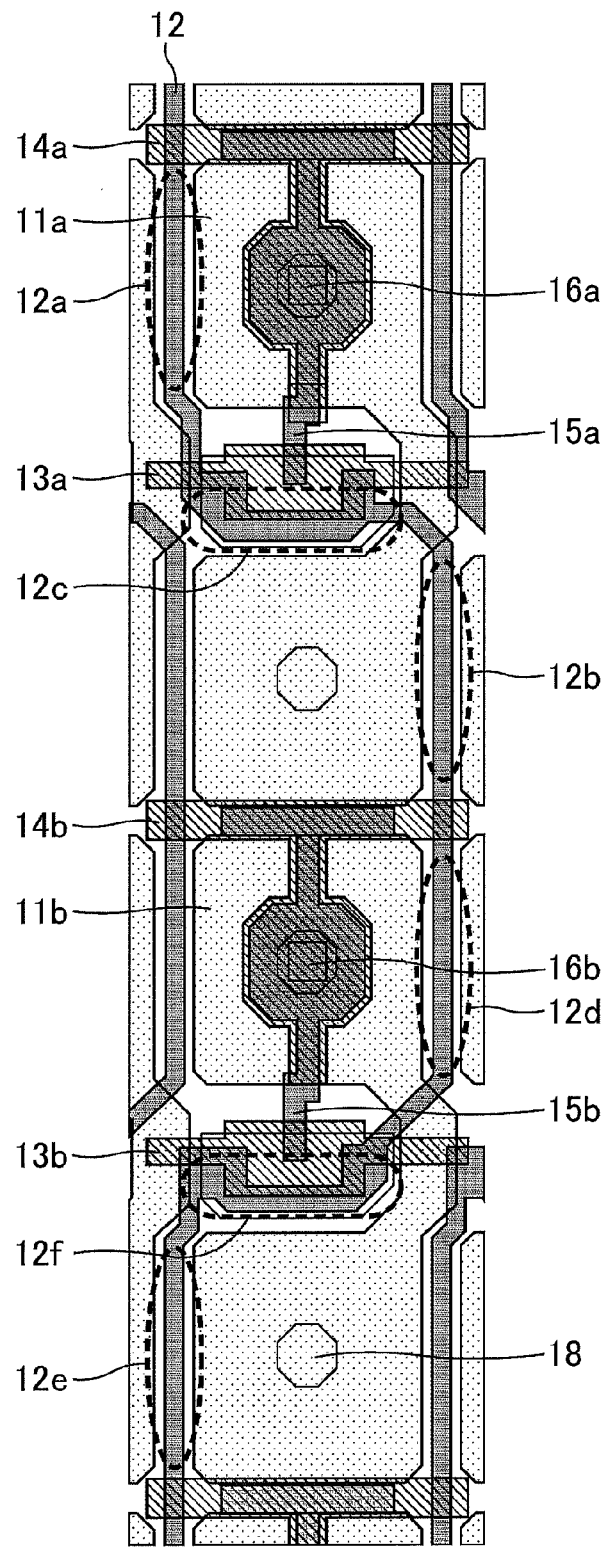
FIG. 7 is a schematic plan view illustrating one example (Example 3) of the active matrix substrate provided in the liquid crystal display device of Embodiment 1.

A detailed description is given on the configuration of the active matrix substrate of Embodiment 1. FIGS. 5 to 7 are schematic plan views each illustrating one example (Examples 1 to 3) of the active matrix substrate provided in the liquid crystal display device of Embodiment 1. In Examples 1 to 3, the active matrix substrate has, in addition to the pixel electrodes 11a and 11b and the source wiring 12, various wirings such as gate wirings 13a and 13b, storage capacitor wirings (CS wiring) 14a and 14b, and drain wirings 15a and 15b, and TFTs (thin film transistors) 17a and 17b as switching elements. These components are respectively formed in different layers via an insulating film.

The TFTs 17a and 17b each have a semiconductor layer made of silicon or the like, and three electrodes including a gate electrode, a source electrode, and a drain electrode. The gate electrode is connected to gate wirings 13a and 13b. The source electrode is connected to the source wiring 12. The drain wirings 15a and 15b are drawn from the drain electrode. Contact holes 16a and 16b are provided in the insulating film at positions overlapping with the drain wiring 15a and 15b. The drain wirings 15a and 15b are connected to the pixel electrodes 11a and 11b through the contact holes 16a and 16b. It is not needed to form all of these wirings in different layers. For example, the gate wirings 13a and 13b and the CS wirings 14a and 14b may be formed of the same material in the same layer. Alternatively, the source wiring 12 and the drain wirings 15a and 15b may be formed of the same material in the same layer. Such a configuration improves the production efficiency.

Various wirings such as the source wiring 12, the gate wirings 13a and 13b, and the CS wirings 14a and 14b, and various electrodes of the TFTs 17a and 17b may be formed of a material having a low specific resistance, such as aluminum (Al), copper (Cu), chromium (Cr), titanium (Ti), tantalum (Ta), and molybdenum (Mo). More specifically, they each may have a configuration including a layer formed of aluminum (Al) or copper (Cu) and layers formed of tantalum nitride (TaN), titanium nitride (TiN), or molybdenum (Mo) stacked on the upper and lower faces of the aluminum or copper layer.

The pixel electrodes 11a and 11b may be formed of patterned films of translucent metal oxides such as ITO (indium tin oxide) and IZO (indium zinc oxide).

In the active matrix substrate of Embodiment 1, one pixel electrode may be provided for each region surrounded by the source wiring and the gate wiring, and one TFT may control one pixel electrode. Alternatively, one sub pixel electrode may be provided for each region surrounded by the source wiring and the gate wiring, and sub pixel electrodes positioned both sides of the gate wiring may be controlled by two TFTs using one gate wiring (i.e. multi pixel gamma control). This case is as same as the case where one pixel electrode is divided into a plurality of sub pixel electrodes to be controlled. To obtain the effect of the present invention, the first side portion, the second side portion, and the crossing portion of the source wiring need to be formed for each of the divided sub pixel electrodes.

According to the active matrix substrate of Embodiment 1, even if an alignment shift is caused between the source wirings or between the pixel electrodes in the row direction, the distance between an edge of one pixel electrode and the source wiring adjacent to the edge is almost the same between the source wiring (self-pixel source wiring) overlapping with the left side of the pixel electrode and the source wiring (next-pixel source wiring) overlapping with the right side of the pixel electrode. Alternatively, a plurality of source wirings overlaps with one pixel electrode, and the overlapping area is almost the same between the source wiring (self-pixel source wiring) overlapping with the left side of the pixel electrode and the source wiring (next-pixel source wiring) overlapping with the right side of the pixel electrode. Accordingly, the value indicated by Csd1−Csd2 (the value obtained by subtracting parasitic capacitance Csd2 formed between the pixel electrode and the next-pixel source wiring from parasitic capacitance Csd1 formed between the pixel electrode and the self-pixel source wiring) is the same in each pixel. Brightness change is therefore suppressed in the case of gray scale display. Especially, the active matrix substrate is suitably used for applications having a gray scale display mode, such as e-books.

According to the active matrix substrate of Embodiment 1, the source wiring is mostly formed between the pixel electrodes adjacent to each other in the row direction, which decreases the value of Csd. Accordingly, brightness shift due to the influence from the Csd is suppressed in single color- or complementary color display.

In addition, according to the active matrix substrate of Embodiment 1, the number of crossing portion of the source wiring to be formed for one pixel electrode is one, which minimizes lowering of the aperture ratio. Since the bent pattern of the source wiring is repeated in every two pixels, the number of crossing portions of the source wiring which crosses the pixel electrode is decreased compared to the case where the bent pattern is repeated in each pixel. Accordingly, higher aperture ratio and volume reduction are realized.

FIG. 5 is a schematic plan view illustrating the active matrix substrate of Example 1. As illustrated in FIG. 5, the pixel electrodes 11a and 11b in Example 1 each have a rectangular shape with three slits formed therein in the row direction. Such a shape divides each of the pixel electrodes 11a and 11b into four regions as a whole. The regions are connected to each other via connecting portions. The connecting portions include parts formed along one side of the pixel electrodes 11a and 11b and parts formed along the other side of the pixel electrodes 11a and 11b. These two parts are alternately formed in the column direction. In Example 1, the case is assumed where the active matrix substrate is used in a CPA liquid crystal display device. The active matrix substrate is configured to allow arrangement of pillar-shaped or hole-type patterns 18 for alignment control at positions overlapping with each of the divided four regions.

In Example 1, the TFTs 17a and 17b are respectively arranged in a middle slit of the pixel electrodes 11a and 11b. Namely, the TFTs 17a and 17b serving as switching elements for driving pixels are positioned near the center of the pixel electrodes 11a and 11b, that is, at intersections of the bisectors of the sides of the pixel electrodes 11a and 11b in the row direction and the bisectors of the sides of the pixel electrodes 11a and 11b in the column direction.

The first side portions 12a and 12d and the second side portions 12b and 12e of the source wiring 12 are running in the column direction. Namely, the first side portions 12a and 12d are parallel with the second side portions 12b and 12e. The gate wirings 13a and 13b are running in the row direction and are positioned to cross the center of the pixel electrodes 11a and 11b along the crossing portions 12c and 12f of the source wiring 12. Portions of the gate wiring 13a and 13b overlapping with the semiconductor layer serve as the gate electrodes of the TFTs 17a and 17b. A specific magnitude of gate voltage connects the source wiring 12 and the drain wirings 15a and 15b. Accordingly, the TFTs 17a and 17b can control when to apply the signal voltage from the source wiring 12 to the pixel electrodes 11a and 11b in accordance with the timing of the gate voltage from the gate wirings 13a and 13b. Such arrangement of the TFTs 17a and 17b arrows the pixel electrodes 11a and 11b to have the same shape in even rows and in odd rows. Accordingly, fluctuation in the parameter due to the difference in the shape of the electrodes is less likely to be caused.

In Example 1, the CS wirings 14a and 14b are running in the row direction to overlap with a clearance between the pixel electrodes 11a and 11b adjacent to each other in the column direction. The CS wirings 14a and 14b are arranged to overlap with the drain wirings 15a and 15b via an insulating film at the center part of the pixel. This configuration allows formation of a predetermined magnitude of the storage capacitance between the drain wirings 15a and 15b. Additionally, The CS wirings in Example 1 also serve to prevent a light leakage from the clearance between the pixel electrodes 11a and 11b adjacent to each other in the column direction, which contributes to increase in the contrast ratio.

FIG. 6 is a schematic plan view of an active matrix substrate of Example 2. As illustrated in FIG. 6, the pixel electrodes 11a and 11b in Example 2 each have a rectangular shape with one slit formed therein in the row direction. Such a shape divides each of the pixel electrodes 11a and 11b into two regions as a whole. The regions are connected to each other via a connecting portion. In addition, wirings are drown from the pixel electrodes 11a and 11b and formed wide at positions overlapping with the drain wirings 15a and 15b of the TFTs 17a and 17b. In the wide portions, the pixel electrodes 11a and 11b are connected to the drain wirings 15a and 15b through the contact holes 16a and 16b formed in the insulating film. In Example 2, the case is assumed where the active matrix substrate is used in a CPA liquid crystal display device. The active matrix substrate is configured to allow arrangement of dot-shaped patterns (e.g. pillar-shaped dielectric protrusion, hole) 18 for alignment control at positions overlapping with each of the divided two regions.

The First side portions 12a and 12d and the second side portions 12b and 12e of the source wiring 12 are running in the column direction. The crossing portions 12c and 12f are positioned to cross the center of the pixel electrode 11a and 11b. The gate wirings 13a and 13b are running in the row direction at positions overlapping with the upper ends of the pixel electrodes 11a and 11b. Portions of the gate wirings 13a and 13b overlapping with the semiconductor layer serve as the gate electrodes of the TFTs 17a and 17b. A specific magnitude of gate voltage connects the source wiring 12 and the drain wirings 15a and 15b. Accordingly, the TFTs 17a and 17b can control when to apply the signal voltage from the source wiring 12 to the pixel electrodes 11a and 11b in accordance with the timing of the gate voltage from the gate wirings 13a and 13b.

In Example 2, the CS wirings 14a and 14b are running in the row direction to overlap with a clearance between the pixel electrodes 13a and 13b. The CS wirings 14a and 14b are arranged to overlap with the drain wirings 15a and 15b via the insulating film. This configuration allows formation of a predetermined magnitude of the storage capacitance between the drain wirings 15a and 15b.

In Example 2, the CS wirings 14a and 14b are running in the row direction at positions overlapping with the clearances between the pixel electrodes 11a and 11b adjacent to each other in the column direction and the wirings drawn from the pixel electrodes 11a and 11b. The CS wirings 14a and 14b are arranged to overlap with the drain wirings 15a and 15b via the insulating film at positions overlapping with the clearance between the pixel electrodes 11a and 11b adjacent to each other in the column direction. This configuration allows formation of a predetermined magnitude of the storage capacitance between the drain wirings 15a and 15b. Additionally, the CS wirings 14a and 14b and the drain electrodes 15a and 15b in Example 2 also serve to prevent a light leakage from the clearance between the pixel electrodes 11a and 11b adjacent to each other in the column direction and from the wirings drawn from the pixel electrodes 11a and 11b, which contributes to increase in the contrast ratio.

FIG. 7 is a schematic plan view of the active matrix substrate of Example 3. As illustrated in FIG. 7, the pixel electrodes 11a and 11b each have a rectangular shape with one slit formed therein in the row direction. Such a shape divides each of the pixel electrodes 11a and 11b into two regions as a whole. The two regions are connected to each other via a connecting portion. In Example 3, the case is assumed where the active matrix substrate is used in a CPA liquid crystal display device. The active matrix substrate is configured to allow arrangement of dot-shaped patterns (e.g. pillar-shaped dielectric protrusion, hole) 18 for alignment control at positions overlapping with each of the divided two regions.

In Example 3, the TFTs 17a and 17b are formed in the slits of the pixel electrodes 11a and 11b. Namely, the TFTs 17a and 17b serving as switching elements for driving pixels are positioned near the center of the pixel electrodes 11a and 11b, that is, at intersections of the bisectors of the sides of the pixel electrodes 11a and 11b in the row direction and the bisectors of the sides of the pixel electrodes 11a and 11b in the column direction.

The first side portions 12a and 12d and the second side portions 12b and 12e of the source wiring 12 are running in the column direction. The gate wirings 13a and 13b are running in the row direction and are positioned to cross the center of the pixel electrodes 11a and 11b along the crossing portions 12c and 12f of the source wiring 12. Portions of the gate wiring 13a and 13b overlapping with the semiconductor layer serve as the gate electrodes of the TFTs 17a and 17b. A specific magnitude of gate voltage connects the source wiring 12 and the drain wirings 15a and 15b. Accordingly, the TFTs 17a and 17b can control when to apply the signal voltage from the source wiring 12 to the pixel electrodes 11a and 11b in accordance with the timing of the gate voltage from the gate wirings 13a and 13b.

In Example 3, the CS wirings 14a and 14b are running in the row direction to overlap with a clearance between the pixel electrodes 11a and 11b adjacent to each other in the column direction. The CS wirings 14a and 14b are arranged to overlap with the drain wirings 15a and 15b via the insulating film at the center part of the pixel. This configuration allows formation of a predetermined magnitude of the storage capacitance between the drain wirings 15a and 15b. Additionally, The CS wirings in Example 3 also serve to prevent a light leakage from the clearance between the pixel electrodes 11a and 11b adjacent to each other in the column direction, which contributes to increase in the contrast ratio.

Figure 8:
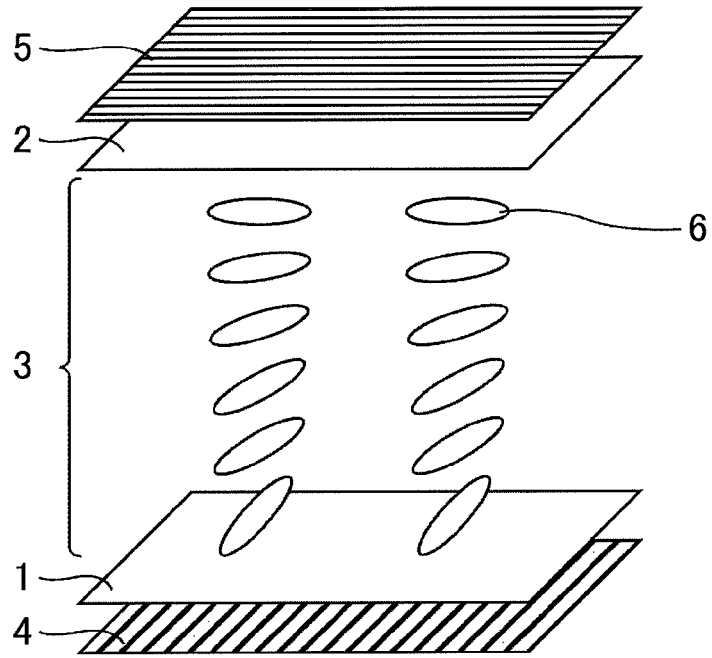
FIG. 8 is a schematic perspective view of a liquid crystal display device in TN mode of Embodiment 1 and illustrates the alignment of liquid crystal molecules without voltage application.
Figure 9:
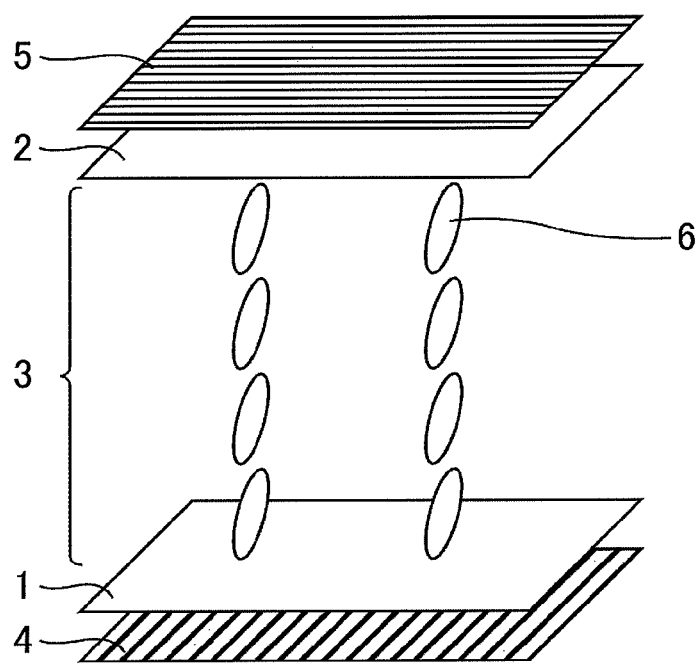
FIG. 9 is a schematic perspective view of a liquid crystal display device in TN mode of Embodiment 1 and illustrates the alignment of liquid crystal molecules with application of a voltage above the threshold.
Figure 10:
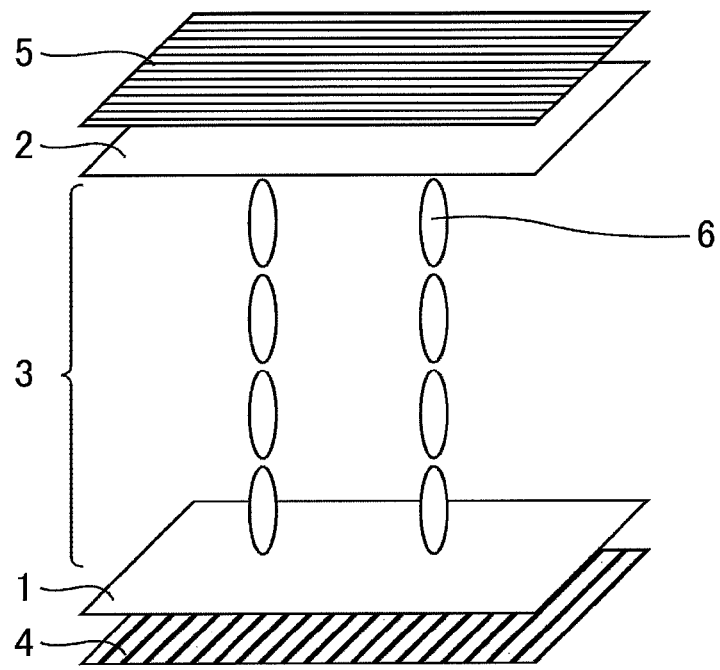
FIG. 10 is a schematic perspective view of a liquid crystal display device in VA mode of Embodiment 1 and illustrates the alignment of liquid crystal molecules without voltage application.
Figure 11:
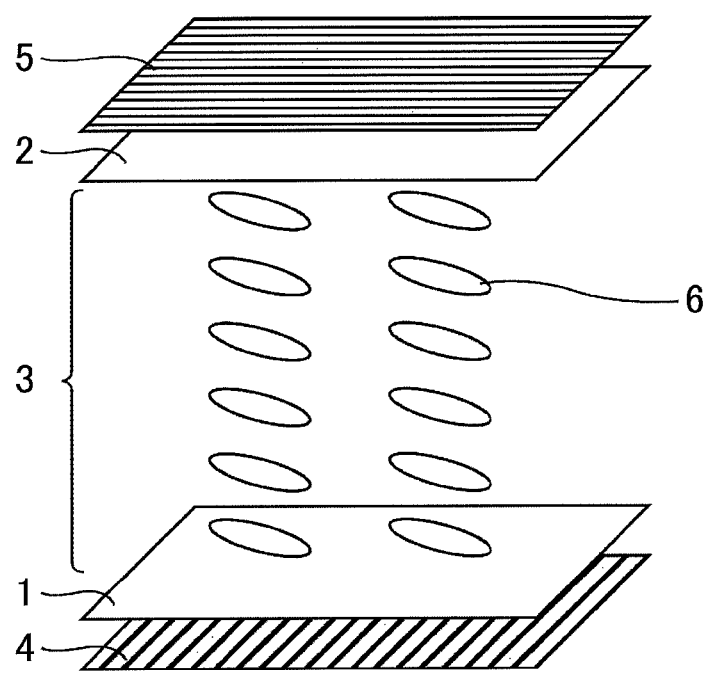
FIG. 11 is a schematic perspective view of a liquid crystal display device in VA mode of Embodiment 1 and illustrates the alignment of liquid crystal molecules with application of a voltage above the threshold.
Figure 12:
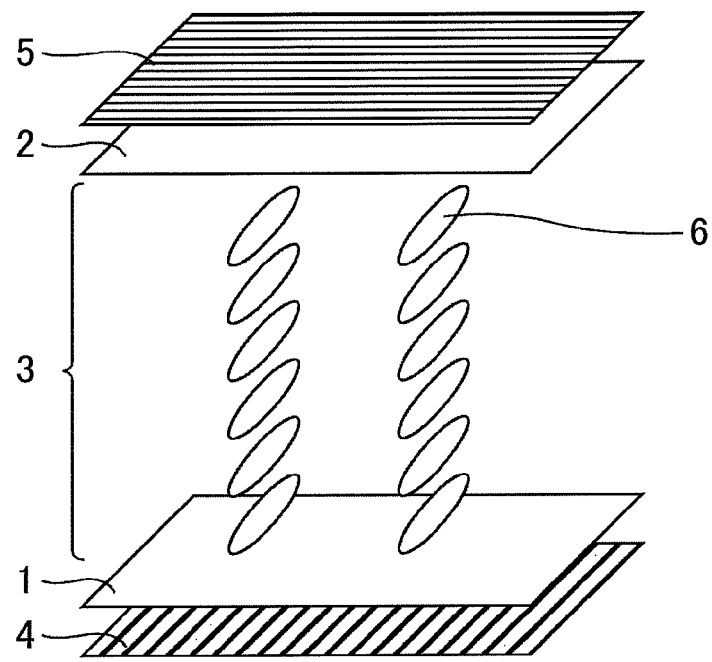
FIG. 12 is a schematic perspective view of a liquid crystal display device in IPS mode of Embodiment 1 and illustrates the alignment of liquid crystal molecules without voltage application.
Figure 13:
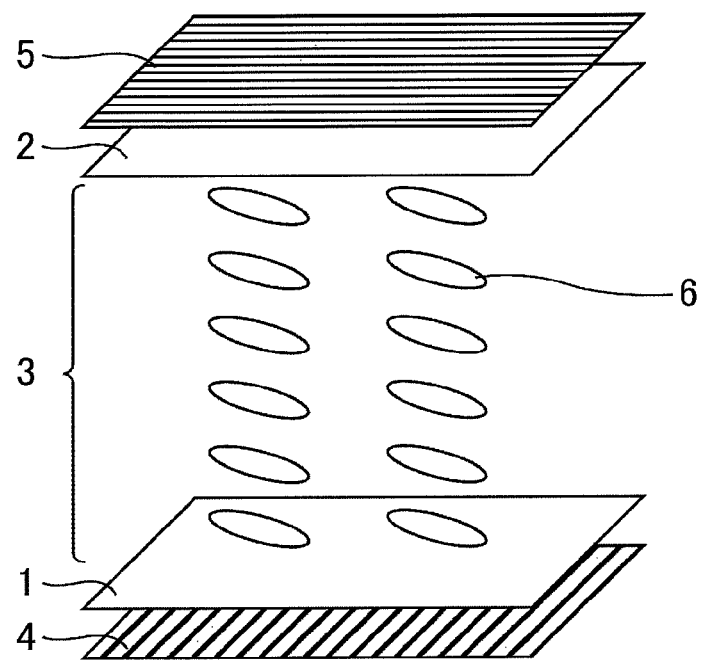
FIG. 13 is a schematic perspective view of a liquid crystal display device in IPS mode of Embodiment 1 and illustrates the alignment of liquid crystal molecules with application of a voltage above the threshold.
Figure 14:
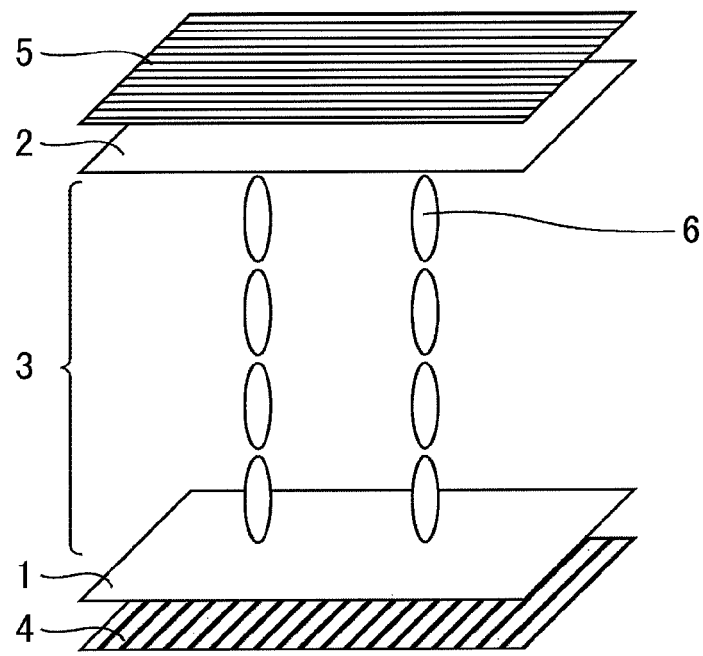
FIG. 14 is a schematic perspective view of a liquid crystal display device in TBA mode of Embodiment 1 and illustrates the alignment of liquid crystal molecules without voltage application.
Figure 15:
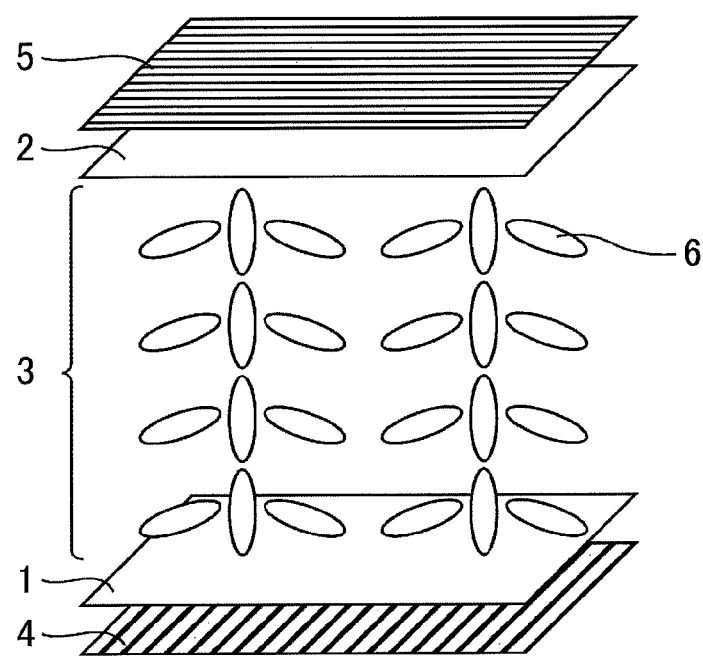
FIG. 15 is a schematic perspective view of a liquid crystal display device in TBA mode of Embodiment 1 and illustrates the alignment of liquid crystal molecules with application of a voltage above the threshold.
Figure 16:
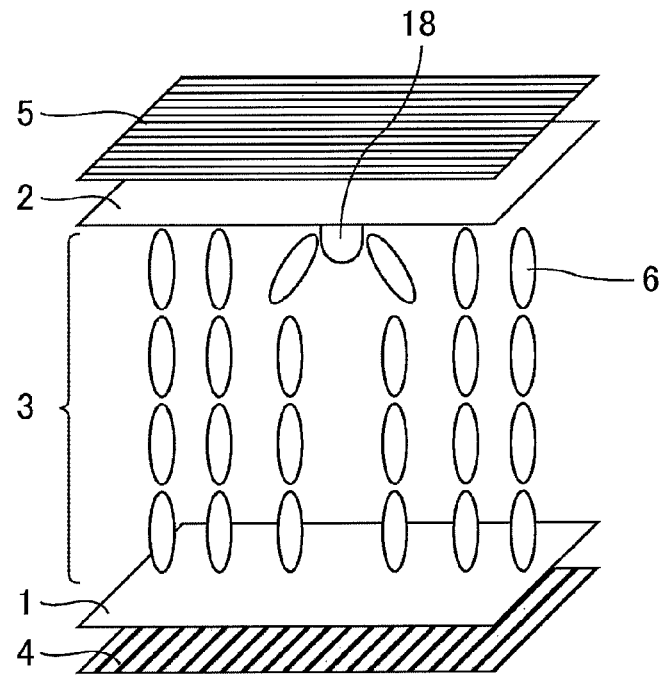
FIG. 16 is a schematic perspective view of a liquid crystal display device in CPA mode of Embodiment 1 and illustrates the alignment of liquid crystal molecules without voltage application.
Figure 17:
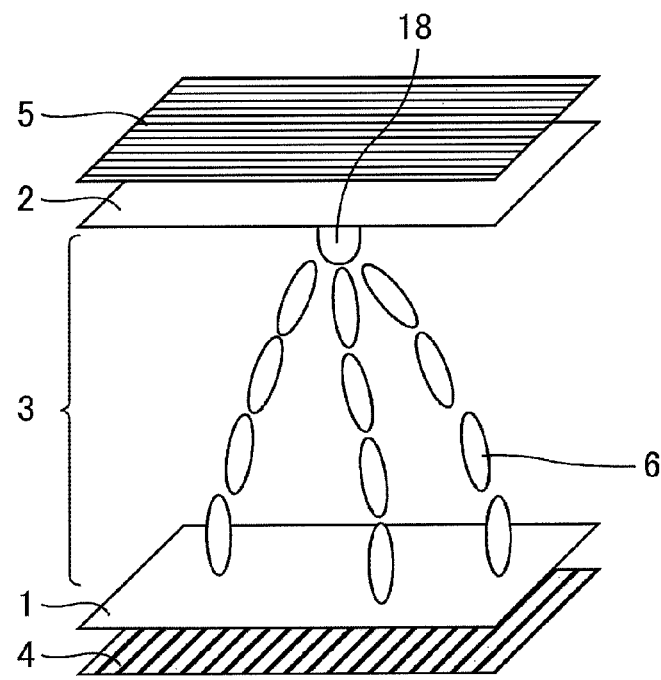
FIG. 17 is a schematic perspective view of a liquid crystal display device in CPA mode of Embodiment 1 and illustrates the alignment of liquid crystal molecules with application of a voltage above the threshold.
Figure 18:
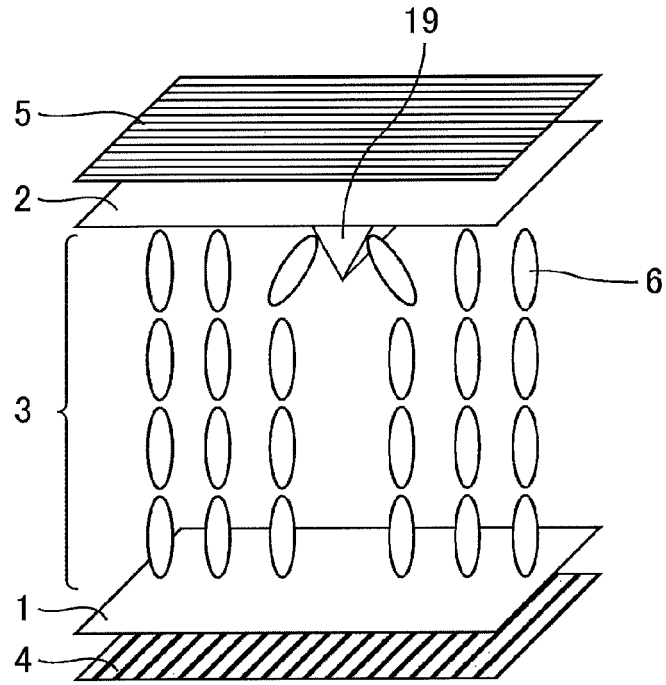
FIG. 18 is a schematic perspective view of a liquid crystal display device in MVA mode of Embodiment 1 and illustrates the alignment of liquid crystal molecules without voltage application.
Figure 19:
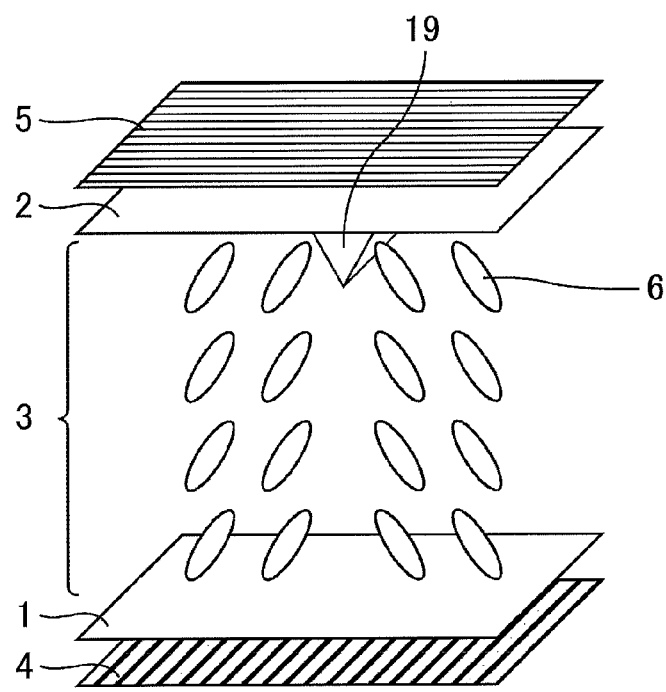
FIG. 19 is a schematic perspective view of a liquid crystal display device in MVA mode of Embodiment 1 and illustrates the alignment of liquid crystal molecules with application of a voltage above the threshold.

FIGS. 8 to 19 are schematic perspective views each illustrating a liquid crystal display device of Embodiment 1 and are different in alignment mode of liquid crystal molecules. FIGS. 8 and 9 each illustrate a liquid crystal display device in TN mode. FIGS. 10 and 11 each illustrate a liquid crystal display device in VA mode. FIGS. 12 and 13 each illustrate a liquid crystal display device in IPS mode. FIGS. 14 and 15 each illustrate a liquid crystal display device in TBA mode. FIGS. 16 and 17 each illustrate a liquid crystal display device in CPA mode. FIGS. 18 and 19 each illustrate a liquid crystal display device in MVA mode. The liquid crystal display device of the present invention can be applied to any of these modes. FIGS. 8, 10, 12, 14, 16, and 18 each illustrate the alignment of liquid crystal molecules without voltage application. FIGS. 9, 11, 13, 15, 17, and 19 each illustrate the alignment of liquid crystal molecules with application of a voltage above the threshold.

As illustrated in FIGS. 8 to 19, the liquid crystal display device of Embodiment 1 is equipped with a liquid crystal display panel having: a pair of substrates including an active matrix substrate 1 with a pixel electrode, a TFT, and the like, and a counter substrate 2; and a liquid crystal layer 3 between the substrates. The pair of substrates respectively have polarizing plates 4 and 5 each attached to a surface on a side not facing the liquid crystal layer. The polarization axis of a polarizer 4 on the active matrix substrate side and the polarization axis of a polarizer 5 on the counter substrate side are orthogonal to each other to form cross Nicol arrangement. The liquid crystal layer 3 is filled with a positive (positive dielectric anisotropic) or negative (negative dielectric anisotropic) liquid crystal material 6.

As illustrated in FIGS. 8 and 9, the liquid crystal display device in TN mode has the liquid crystal layer 3 filled with the positive liquid crystal material 6. The pair of substrates 1 and 2 each have electrodes which form a pair with each other. When no voltage is applied, liquid crystal molecules near the substrate face are aligned horizontally to the substrate face due to an influence of the alignment film. As approaching from one substrate 1 to the other substrate 2, the liquid crystal molecules are twisted towards the in-plane direction. Such an alignment allows the long axis of the liquid crystal molecules near the substrate 1 and the long axis of the liquid crystal molecules near the other substrate 2 to form an angle of about 90° in a view from the normal direction to the surfaces of the substrates 1 and 2. When a voltage is applied, liquid crystal molecules 6 are tilt towards the direction perpendicular to the surfaces of the substrates 1 and 2.

As illustrated in FIGS. 10 and 11, the liquid crystal display device in VA mode has the liquid crystal display layer 3 filled with the negative liquid crystal material 6. The pair of substrates 1 and 2 each have electrodes which form a pair with each other. When no voltage is applied, the liquid crystal molecules 6 near the surfaces of the substrates 1 and 2 are aligned perpendicular to the substrate surfaces due to an influence of the alignment film. When a voltage is applied, the liquid crystal molecules 6 are tilt towards the direction horizontal to the surfaces of the substrates 1 and 2.

As illustrated in FIGS. 12 and 13, the liquid crystal display device in IPS mode has the liquid crystal layer 3 filled with the positive liquid crystal material 6. One of the substrates 1 and 2 have electrodes which form a pair with each other. When no voltage is applied, the liquid crystal molecules 6 near the surfaces of the substrates 1 and 2 are aligned horizontally to the substrate face due to an influence of the alignment film. When a voltage is applied, the liquid crystal molecules 6 are turned in the in-plane direction while maintaining the tilt angle.

As illustrated in FIGS. 14 and 15, the liquid crystal display device in TBA mode has the liquid crystal layer 3 filled with the positive liquid crystal material 6. One of the substrates 1 and 2 have electrodes which form a pair with each other. When no voltage is applied, the liquid crystal molecules 6 near the surfaces of the substrates 1 and 2 are aligned perpendicular to the substrate surfaces due to an influence of the alignment film. When a voltage is applied, the liquid crystal molecules 6 are aligned to form an arch.

As illustrated in FIGS. 16 and 17, the liquid crystal display device in CPA mode has the liquid crystal layer 3 filled with the negative liquid crystal material 6. The pair of substrates 1 and 2 each have electrodes which form a pair with each other. On one or both of the pair of substrates 1 and 2, dot-shaped pattern (e.g. pillar-shaped dielectric protrusion, hole) 18 for alignment control is formed. When no voltage is applied, the liquid crystal molecules 6 near the surfaces of the substrates 1 and 2 are aligned perpendicular to the substrate surfaces due to an influence of the alignment film. When a voltage is applied, the liquid crystal molecules 6 are aligned radially around the pattern 18 for alignment control.

As illustrated in FIGS. 18 and 19, the liquid crystal display device in MVA mode has the liquid crystal layer 3 filled with the negative liquid crystal material 6. The pair of substrates 1 and 2 each have electrodes which form a pair with each other. On one or both of the pair of substrates 1 and 2, a linear pattern (e.g. wall-shaped dielectric protrusion, slit) 19 for alignment control is formed. When no voltage is applied, the liquid crystal molecules 6 near the surfaces of the substrates 1 and 2 are aligned perpendicular to the substrate surfaces due to an influence of the alignment film. When a voltage is applied, the liquid crystal molecules 6 are aligned laterally towards the pattern 19 for alignment control.

The liquid crystal display device of Embodiment 1 is applicable to any of these alignment modes. The TN mode or CPA mode is favorably used in the present embodiment in which the pixel electrode has a substantially rectangular shape.

Embodiment 2

Embodiment 2 is one example of the liquid crystal display device of the present invention in which the active matrix substrate of the present invention is used. In the liquid crystal display device of Embodiment 2, the pixel electrode has a substantially V shape, not a substantially rectangular shape. The liquid crystal display device of Embodiment 2 is as same as the liquid crystal display device of Embodiment 1 except that the pixel electrode has one angled portion.

Figure 20:
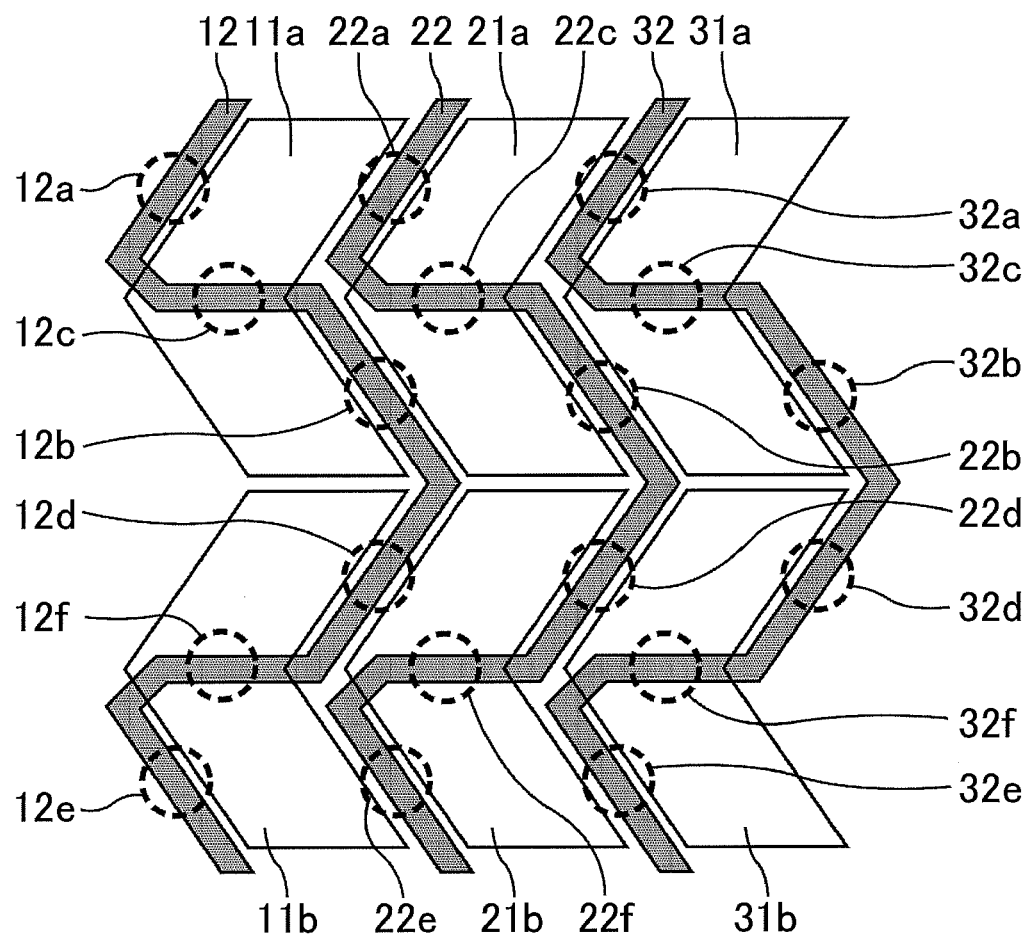
FIG. 20 is a schematic plan view illustrating a positional relationship between pixel electrodes and source wirings of an active matrix substrate provided in a liquid crystal display device Embodiment 2.

FIG. 20 is a schematic plan view illustrating a positional relationship between pixel electrodes and source wirings of an active matrix substrate provided in a liquid crystal display device Embodiment 2. In Embodiment 2, the pixel electrodes 11a, 11b, 21a, 21b, 31a, and 31b each have a substantially "<" shape (V shape rotated by 90°). The source wirings 12, 22, and 32 are each formed to partially overlap with a clearance between two pixel electrodes adjacent to each other in the row direction. The source wirings 12, 22, and 32 each have a bent portion from which the crossing portion is formed. The crossing portions are formed to cross the pixel electrodes 11a, 11b, 21a, 21b, 31a, and 31b. Accordingly, the source wiring 12, 22, and 32 each have a zigzag shape as a whole. More specifically, the source wiring 12, for example, have the first side portions 12a and 12d running along one side of the pixel electrodes 11a and 11b in the column direction, the second side portions 12b and 12e running along the other side of the pixel electrodes 11a and 11b in the column direction, and the crossing portions 12c and 12f connecting the first side portions 12a and 12d with the second side portions 12b an 12e. One each of these portions is provided in each of the pixel electrodes 11a and 11b. The crossing portions 12c and 12f are formed at positions overlapping with bisectors of one side of the pixel electrodes 11a and 11b in the column direction. The length of the first side portion is almost the same as the length of the second side portion. In Embodiment 2, the first side portions 12a and 12d are not parallel with the second side portions 12b and 12e, and extended lines thereof form angles with each other. Also in the second source wiring 22 and the third source wiring 32, the first side portions 22a, 32a, 22d, and 32d, the second side portions 22b, 22e, 32b, and 32e, and the crossing portions 22c, 22f, 32c, and 32f are formed in the similar patterns.

According to the arrangement of the source wiring of Embodiment 2, variation in the magnitude of the potential that fluctuates due to influence of the source wirings 12, 22, and 32 is not great among the pixel electrodes. The variation in the pixel potential is therefore less likely to be caused among the pixel electrodes 11a, 21a, and 31a or among the pixel electrodes 11b, 21b, and 31b adjacent to each other in the row direction. No source wiring is formed to overlap with a clearance between two pixel electrodes 11a and 11b, between two pixel electrodes 21a and 21b, and between two pixel electrodes 31a and 31b adjacent to each other in the column direction. In such a case, even if an alignment shift is present in the column direction, the pixel potential hardly varies between two pixel electrodes 11a and 11b, between two pixel electrodes 21a and 21b, and between two pixel electrodes 31a and 31b adjacent to each other in the column direction.

The liquid crystal display device of Embodiment 2 is applicable to any of these alignment modes. Since the pixel electrode has a substantially "<" shape (V shape rotated by 90°), the liquid crystal display device favorably achieves improvement in the viewing angle and higher aperture ratio especially when used in IPS, VA, MVA, and TBA modes.

Embodiment 3

Embodiment 3 is one example of the liquid crystal display device of the present invention in which the active matrix substrate of the present invention is used. In the liquid crystal display device of Embodiment 3, the pixel electrode has a substantially W shape, not a substantially rectangular shape. Namely, the pixel electrode has three angled portions. Except for this, the liquid crystal display device of Embodiment 3 is as same as the liquid crystal display device of Embodiment 1.

Figure 21:
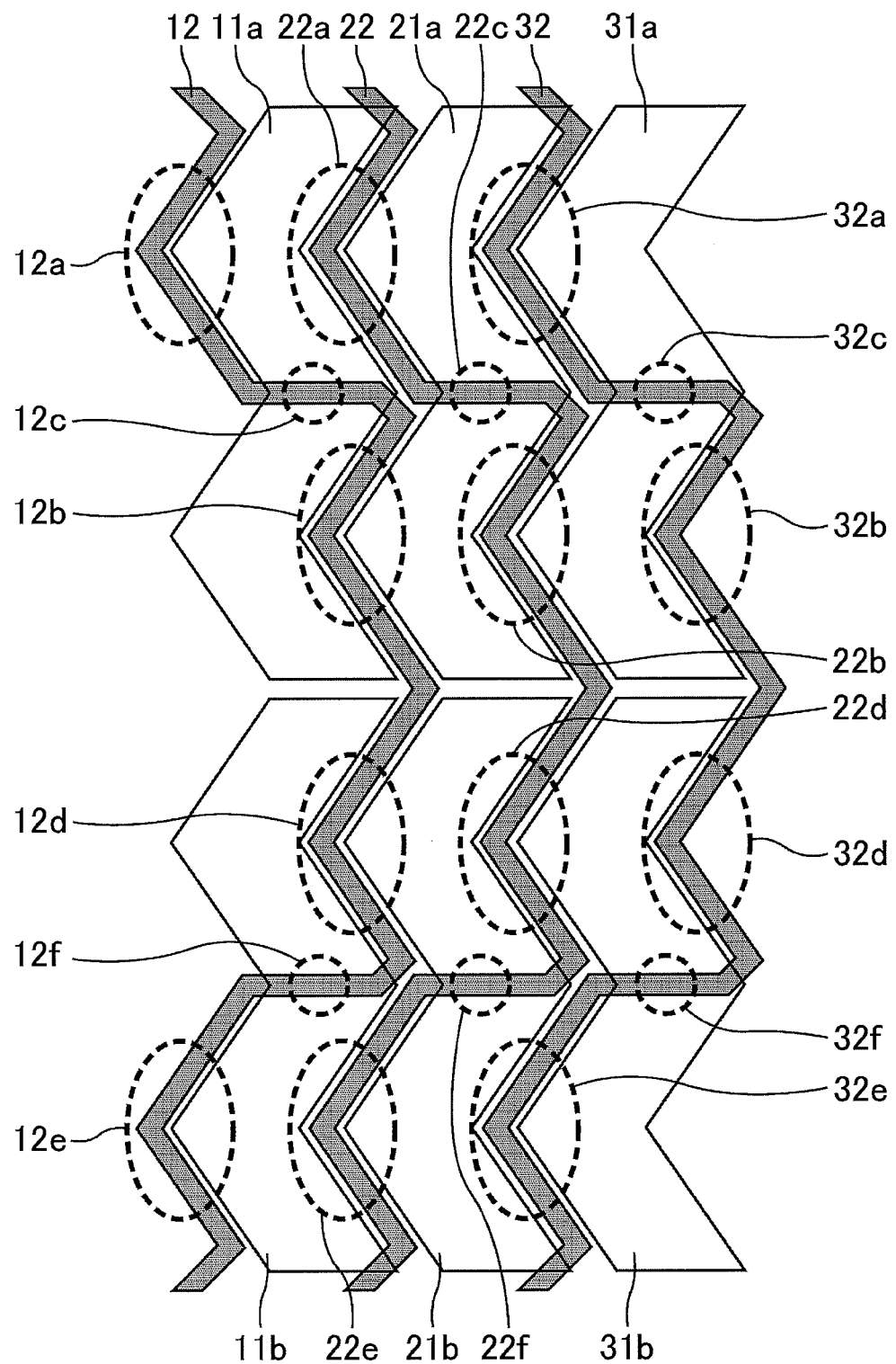
FIG. 21 is a schematic plan view illustrating a positional relationship between pixel electrodes and source wirings of an active matrix substrate provided in a liquid crystal display device Embodiment 3.

FIG. 21 is a schematic plan view illustrating a positional relationship between pixel electrodes and source wirings of an active matrix substrate provided in a liquid crystal display device of Embodiment 3. In Embodiment 3, the pixel electrodes 11a, 11b, 21a, 21b, 31a, and 31b each have a shape of two "<"s stacked in the column direction (W shape rotated by 90°). The source wirings 12, 22, and 32 are each formed to partially overlap with a clearance between two pixel electrodes adjacent to each other in the row direction. The source wirings 12, 22, and 32 each have a bent portion from which the crossing portion is formed. The crossing portions are formed to cross the pixel electrodes 11a, 11b, 21a, 21b, 31a, and 31b. Accordingly, the source wiring 12, 22, and 32 each have a zigzag shape as a whole. More specifically, the source wiring 12, for example, has the first side portions 12a and 12d running along one side of the pixel electrodes 11a and 11b in the column direction, the second side portions 12b and 12e running along the other side of the pixel electrodes 11a and 11b in the column direction, and the crossing portions 12c and 12f connecting the first side portions 12a and 12d with the second side portions 12b an 12e. One each of these portions is provided in one each of the pixel electrodes 11a and 11b. The crossing portions 12c and 12f are formed at positions overlapping with bisectors of one side of the pixel electrode in 11a and 11b in the column direction. The length of the first side portion is almost the same as the length of the second side portion. In Embodiment 3, the first side portions 12a and 12d and the second side portions 12b and 12e each have a "<" shape (V shape rotated by 90°. Also in the second source wiring 22 and the third source wiring 32, the first side portions 22a, 32a, 22d, and 32d, the second side portions 22b, 22e, 32b, and 32e, and the crossing portions 22c, 22f, 32c, and 32f are formed in the similar patterns.

According to the arrangement of the source wiring of Embodiment 3, variation in the magnitude of the potential that fluctuates due to influence of the source wirings 12, 22, and 32 is not great among the pixel electrodes. The variation in the pixel potential is therefore less likely to be caused among the pixel electrodes 11a, 21a, and 31a or among the pixel electrodes 11b, 21b, and 31b adjacent to each other in the row direction. No source wiring is formed to overlap with a clearance between two pixel electrodes 11a and 11b, between two pixel electrodes 21a and 21b, and between two pixel electrodes 31a and 31b adjacent to each other in the column direction. In such a case, even if an alignment shift is present in the column direction, the pixel potential hardly varies between two pixel electrodes 11a and 11b, between two pixel electrodes 21a and 21b, and between two pixel electrodes 31a and 31b adjacent to each other in the column direction.

The liquid crystal display device of Embodiment 3 is applicable to any of these alignment modes. Since the pixel electrode has a shape of two "<"s stacked in the column direction (W shape rotated by 90°), the liquid crystal display device favorably achieves improvement in the viewing angle and higher aperture ratio especially when used in IPS, VA, MVA, and TBA modes.

Embodiment 4

Embodiment 4 is one example of the liquid crystal display device of the present invention in which the active matrix substrate of the present invention is used. In a liquid crystal display device of Embodiment 4, the number of crossing portions of a source wiring across a pixel electrode is not one but two. Except for this, the liquid crystal display device of Embodiment 4 is as same as the liquid crystal display device of Embodiment 1. Namely, the pixel electrode in Embodiment 4 has a substantially rectangular shape.

Figure 22:
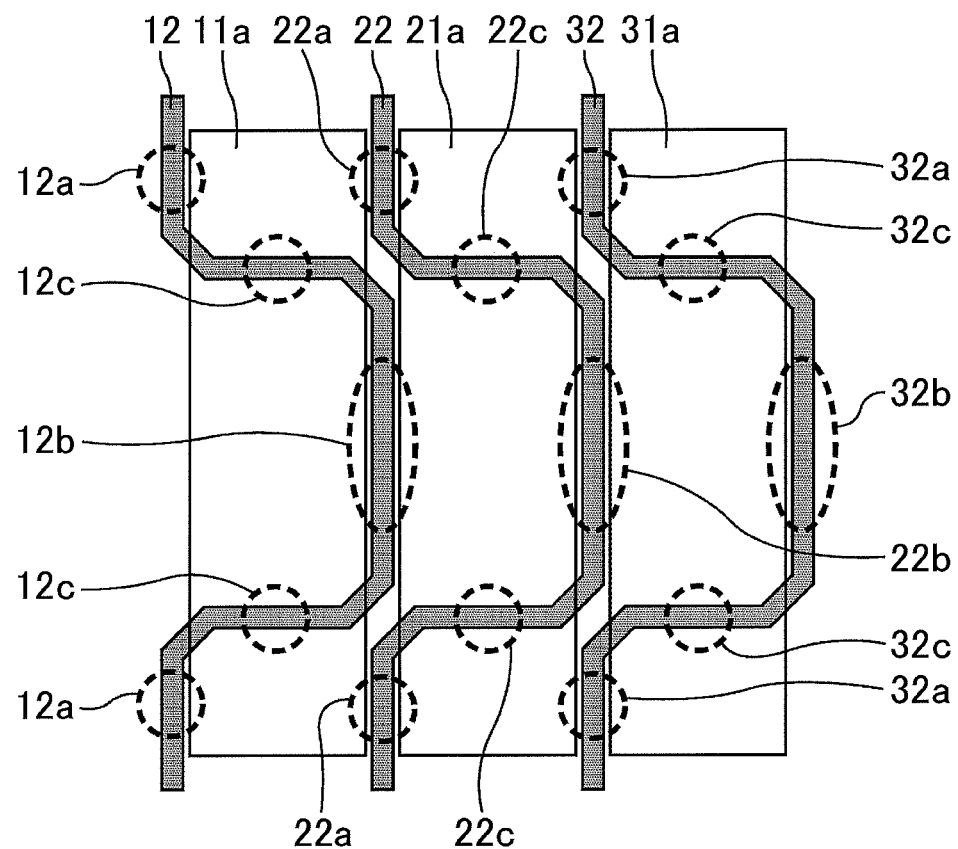
FIG. 22 is a schematic plan view illustrating a positional relationship between pixel electrodes and source wirings of an active matrix substrate provided in a liquid crystal display device Embodiment 4.

FIG. 22 is a schematic plan view illustrating a positional relationship between pixel electrodes and source wirings of an active matrix substrate provided in a liquid crystal display device Embodiment 4. The source wirings 12, 22, and 32 are each formed to partially overlap with a clearance between two pixel electrodes adjacent to each other in the row direction. The source wirings 12, 22, and 32 each have bent portions from which the crossing portions are formed. The crossing portions are formed to cross the pixel electrodes 11a, 21a, and 31a. Accordingly, the source wiring 12, 22, and 32 each have a zigzag shape as a whole. More specifically, the source wiring 12, for example, have the first side portion 12a running along one side of the pixel electrode 11a, the second side portion 12b running along the other side of the pixel electrode 11a, and the crossing portion 12c connecting the first side portion 12a and the second side portions 12b. Two each of these portions are provided in one pixel electrode 11a. The crossing portions 12c are formed to substantially trisect one side of each pixel electrode 11a in the column direction. The total length of the first side portions and the total length of the second side portions are substantially the same. In Embodiment 4, the first side portions 12a and the second side portions 12b are parallel with each other. Also in the second source wiring 22 and the third source wiring 32, first side portions 22a and 32a, second side portions 22b and 32b, and the crossing portions 22c and 32c are formed in the same pattern.

According to the arrangement of the source wiring of Embodiment 4, variation in the magnitude of the potential that fluctuates due to influence of the source wirings 12, 22, and 32 is not great among the pixel electrodes. The variation in the pixel potential is therefore less likely to be caused among the pixel electrodes 11a, 21a, and 31a adjacent to each other in the row direction. No source wiring is formed to overlap with a clearance between two pixel electrodes adjacent to each other in the column direction. In such a case, the variation in the pixel potential is less likely to be caused between the two pixel electrodes adjacent to each other in the column direction even if an alignment shift in the column direction is present.

In Embodiment 4, two first side portions 12a are formed in one pixel electrode 11a. In such a case, the aperture ratio is inferior to that in Embodiment 1. However, since the parasitic capacitance Csd1 formed between the pixel electrode and the self-pixel source wiring includes two parasitic capacitances (first Csd1+second Csd1≈Csd2), the value indicated by Csd1−Csd2 is almost zero.

The liquid crystal display device of Embodiment 4 is applicable to any of these alignment modes. The TN mode or CPA mode is favorably used in the present embodiment in which the pixel electrode has a substantially rectangular shape.

Embodiment 5

Embodiment 5 is one example of the liquid crystal display device of the present invention in which the active matrix substrate of the present invention is used. In a liquid crystal display device of Embodiment 5, the number of crossing portions of a source wiring across a pixel electrode is not one but two. Except for this, the liquid crystal display device of Embodiment 5 is as same as the liquid crystal display device of Embodiment 3. Namely, the pixel electrode in Embodiment 5 has a substantially W shape.

Figure 23:
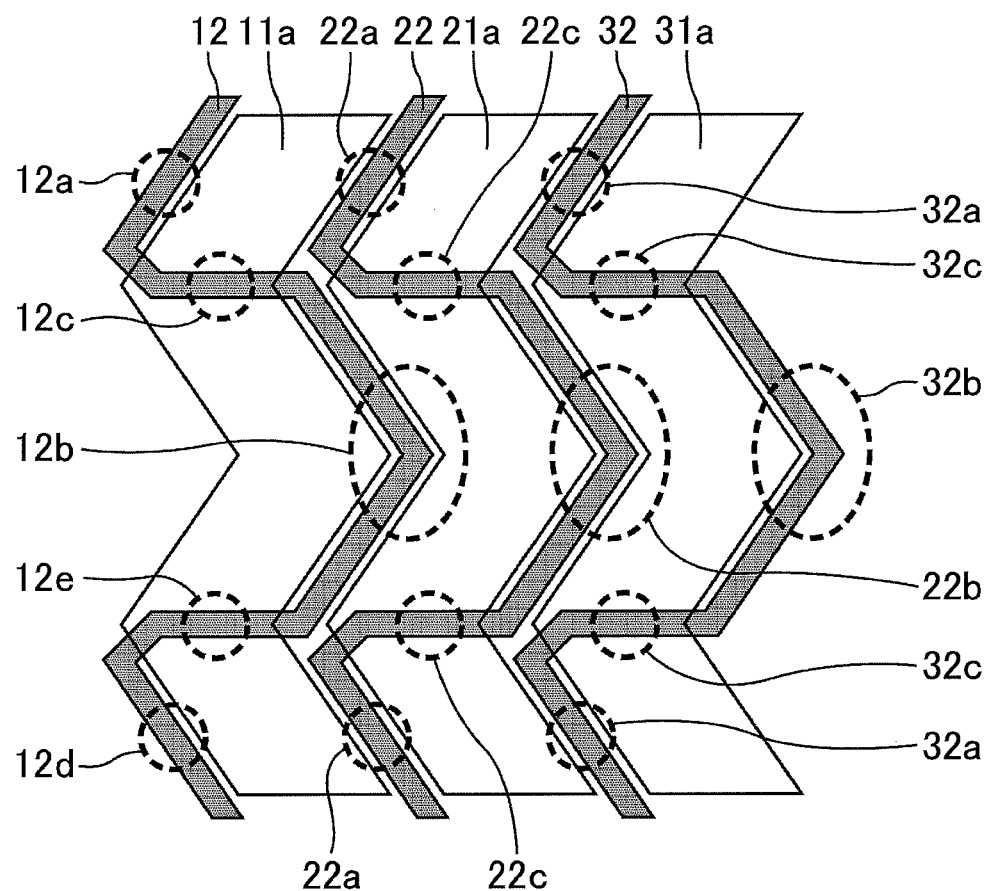
FIG. 23 is a schematic plan view illustrating a positional relationship between pixel electrodes and source wirings of an active matrix substrate provided in a liquid crystal display device Embodiment 5.

FIG. 23 is a schematic plan view illustrating a positional relationship between pixel electrodes and source wirings of an active matrix substrate provided in a liquid crystal display device of Embodiment 5. The source wirings 12, 22, and 32 are each formed to partially overlap with a clearance between two pixel electrodes adjacent to each other in the row direction. The source wirings 12, 22, and 32 each have bent portions from which the crossing portions are formed. The crossing portions are formed to cross the pixel electrodes 11a, 21a, and 31a. Accordingly, the source wiring 12, 22, and 32 each have a zigzag shape as a whole. More specifically, the source wiring 12, for example, has the first side portion 12a running along one side of the pixel electrode 11a, the second side portion 12b running along the other side of the pixel electrode 11a, and the crossing portions 12c and 12e each connecting the first side portion 12a and the second side portions 12b. Two each of these portions are provided in one pixel electrode 11a. The crossing portions 12c and 12e are formed to substantially trisect one side of each pixel electrode 11a in the column direction. The total length of the first side portions and the total length of the second side portions are substantially the same. In Embodiment 5, one of the first side portion 12a and the second side portion 12b has a "<" shape (V shape rotated by 90°). Two first side portions 12a are formed for one pixel electrode 11a. Also in the second source wiring 22 and the third source wiring 32, first side portions 22a and 32a, second side portions 22b and 32b, and the crossing portions 22c, 22e, 32c, and 32e are formed in the same pattern.

According to the arrangement of the source wiring of Embodiment 5, variation in the magnitude of the potential that fluctuates due to influence of the source wirings 12, 22, and 32 is not great among the pixel electrodes. The variation in the pixel potential is therefore less likely to be caused among the pixel electrodes 11a, 21a, and 31a adjacent to each other in the row direction. No source wiring is formed to overlap with a clearance between two pixel electrodes adjacent to each other in the column direction. In such a case, the variation in the pixel potential is less likely to be caused between two pixel electrodes adjacent to each other in the column direction even if an alignment shift in the column direction is present.

In Embodiment 5, two first cross portions 12C are formed in one pixel electrode 11a. In such a case, the aperture ratio is inferior to that in Embodiment 1. However, since the parasitic capacitance Csd1 formed between the pixel electrode and the self-pixel source wiring includes two parasitic capacitances (first Csd1+second Csd1≈Csd2), the value indicated by Csd1−Csd2 is almost zero. In addition, the even number of the crossing portions does not require change in the pattern of the electrodes, wirings, thin film transistors, and the like in the pixels aligned in the column direction and allows formation thereof in the same pattern in all the pixels. Accordingly, fluctuation in the parameter of the pixel potential and the variation in the alignment of liquid crystal molecules are suppressed.

The liquid crystal display device of Embodiment 5 is applicable to any of these alignment modes. Since the pixel electrode has a shape of two "<"s stacked in the column direction (W shape rotated by 90°), the liquid crystal display device favorably achieves improvement in the viewing angle and higher aperture ratio especially when used in IPS, VA, MVA, and TBA modes.

Embodiment 6

Embodiment 6 is one example of the liquid crystal display device of the present invention in which the active matrix substrate of the present invention is used. A liquid crystal display device of Embodiment 6 has pixel electrodes each with a hoop-shaped part in a part of its side. The pixel electrodes have a ladder shape as a whole. Except for this, the liquid crystal display device of Embodiment 6 is as same as the liquid crystal display device of Embodiment 1. Namely, the pixel electrode in Embodiment 6 has a substantially rectangular shape.

Figure 24:
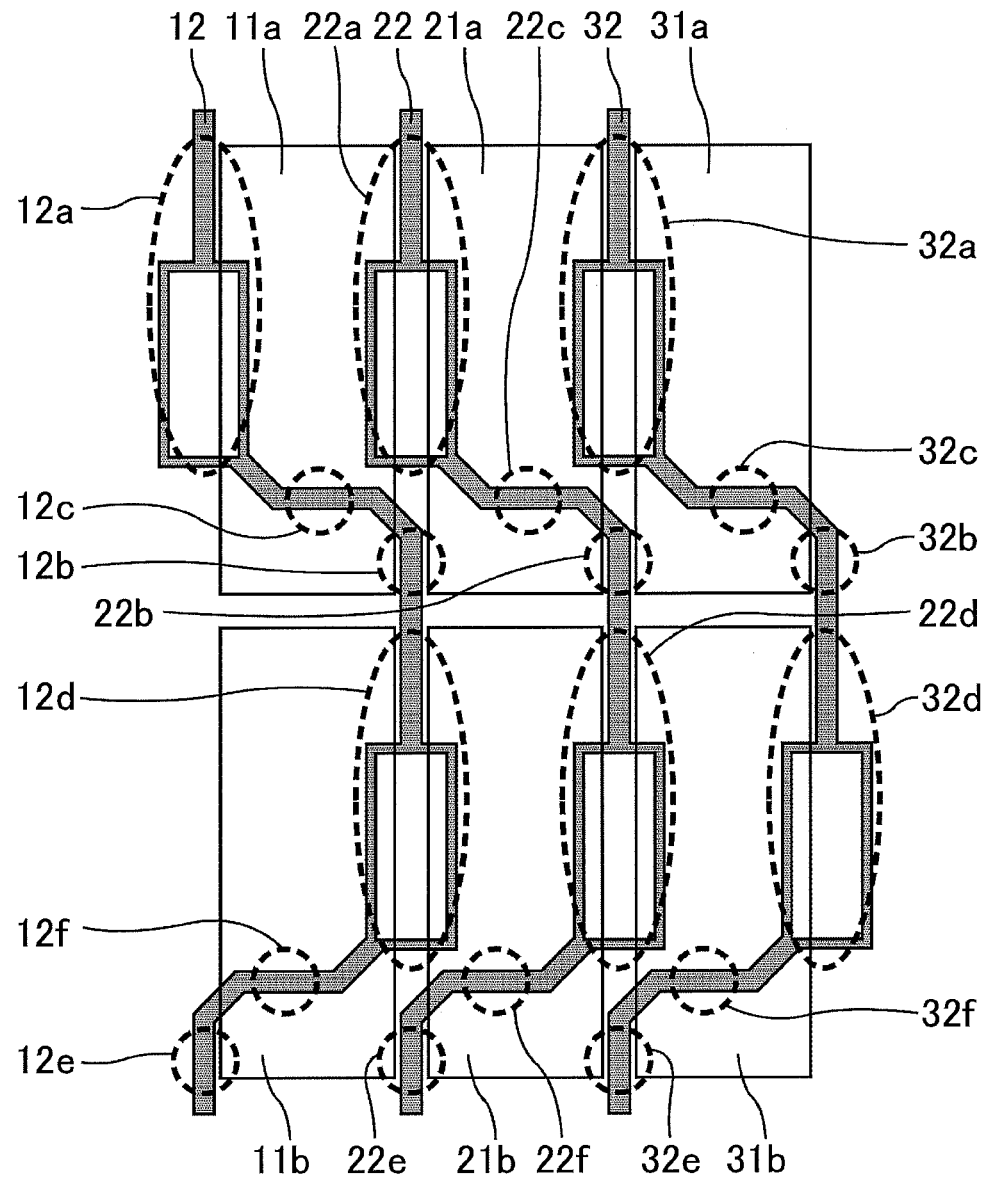
FIG. 24 is a schematic plan view illustrating a positional relationship between pixel electrodes and source wirings of an active matrix substrate provided in a liquid crystal display device Embodiment 6.

FIG. 24 is a schematic plan view illustrating a positional relationship between pixel electrodes and source wirings of an active matrix substrate provided in a liquid crystal display device Embodiment 6. The source wirings 12, 22, and 32 are each formed to partially overlap with a clearance between two pixel electrodes adjacent to each other in the row direction. The source wirings 12, 22, and 32 each have bent portions from which the crossing portions are formed. The crossing portions are formed to cross the pixel electrodes 11a, 11b, 21a, 21b, 31a, and 31b. Accordingly, the source wiring 12, 22, and 32 each have a zigzag shape as a whole. More specifically, the source wiring 12, for example, has the first side portions 12a and 12d running along one side of the pixel electrode 11a and 11b, the second side portions 12b and 12e running along the other side of the pixel electrode 11a and 11b, and the crossing portions 12c and 12f connecting the first side portions 12a and 12d and the second side portions 12b and 12e. One each of these portions is provided for one pixel electrode. Also in the second source wiring 22 and the third source wiring 32, the first side portions 22a, 32a, 22d, and 32d, the second side portions 22b, 22e, 32b, and 32e, and the crossing portions 22c, 22f, 32c, and 32f are formed in the same pattern.

In Embodiment 6, the source wiring is divided into two parts from a branch point and combined at another branch point. One hoop-shaped portion formed in such a manner is provided for each pixel electrode. Namely, one of the first side portions 12a and 12d and the second side portions 12b and 12e have hoop-shaped portions, so that one source wiring 12 have a ladder shape as a whole.

According to Embodiment 6, even if an alignment shift in the row direction is present, the variation in the pixel potential is less likely to be caused because the overlapping areas between the pixel electrodes and the source wirings are equalized. In addition, the aperture ratio is less likely to be lowered compared to an embodiment in which the whole source wiring is overlapped with the pixel electrode and crosses the clearance between the pixel electrodes adjacent to each other in the row direction.

According to the arrangement of the source wiring of Embodiment 6, variation in the magnitude of the potential that fluctuates due to influence of the source wirings 12, 22, and 32 is not great among the pixel electrodes. The variation in the pixel potential is therefore less likely to be caused among the pixel electrodes 11a, 21a, and 31a or the pixel electrodes 11b, 21b, and 31b adjacent to each other in the row direction. No source wiring is formed to overlap with a clearance between two pixel electrodes 11a and 11b, 21a and 21b, or 31a and 31b adjacent to each other in the column direction. In such a case, the variation in the pixel potential is less likely to be caused between two pixel electrodes 11a and 11b, 21a and 21b, or 31a and 31b adjacent to each other in the column direction even if an alignment shift in the column direction is present.

According to Embodiment 6, even if an alignment shift in the row direction is present, the variation in the pixel potential is less likely to be caused because the respective overlapping areas between the pixel electrodes and the source wirings are equalized between the pixel electrodes adjacent to each other in the row direction. Accordingly, the aperture ratio is less likely to be lowered compared to an embodiment in which most of the source wiring is overlapped with the pixel electrode and crosses a clearance between the pixel electrodes adjacent to each other in the row direction.

The liquid crystal display device of Embodiment 6 is applicable to any of these alignment modes. The TN mode or CPA mode is favorably used in the present embodiment in which the pixel electrode has a substantially rectangular shape.

Embodiment 7

Embodiment 7 is one example of the liquid crystal display device of the present invention in which the active matrix substrate of the present invention is used, and is applicable to any of Embodiments 1 to 6.

Figure 25:
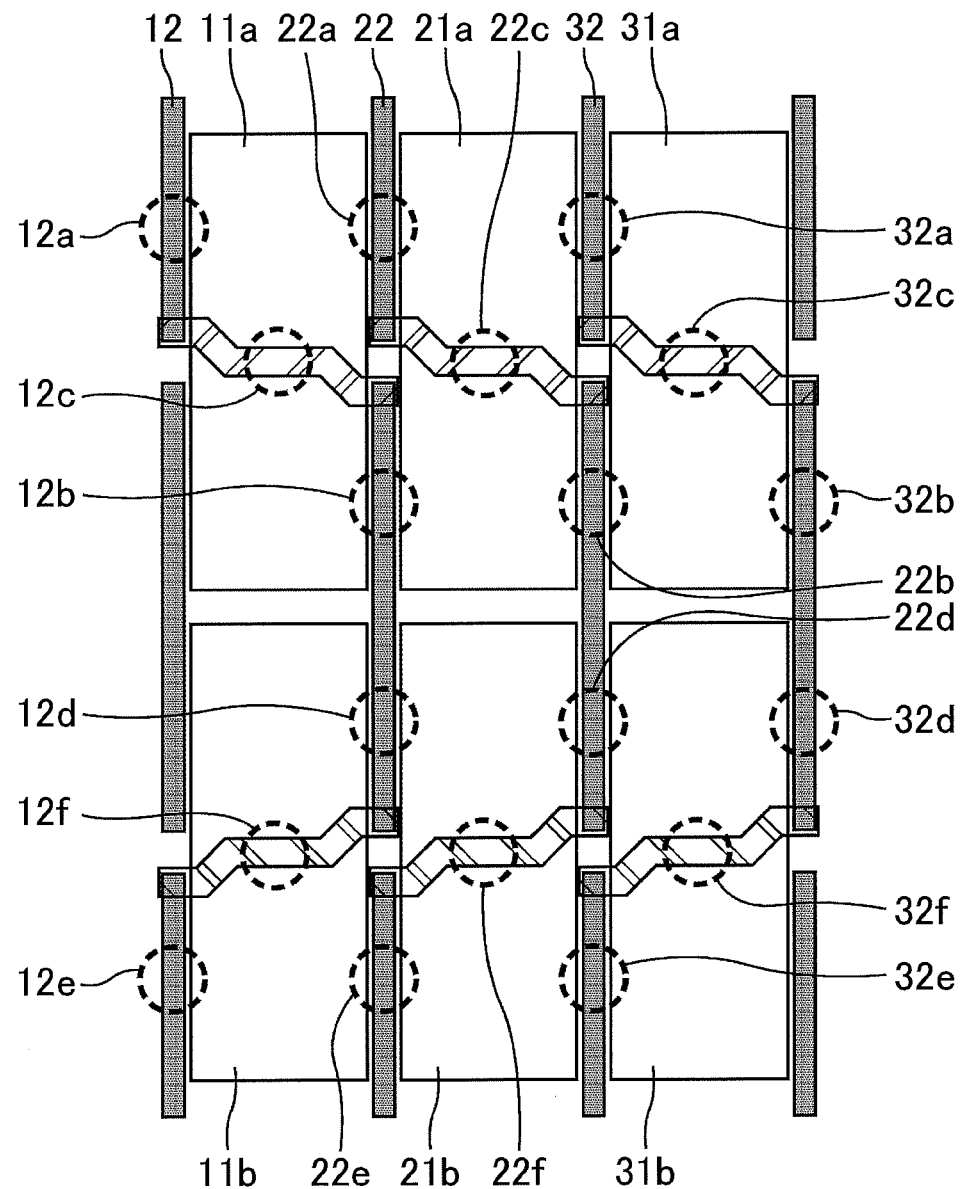
FIG. 25 is a schematic plan view illustrating a positional relationship between pixel electrodes and source wirings of an active matrix substrate provided in a liquid crystal display device Embodiment 7.
Figure 26:
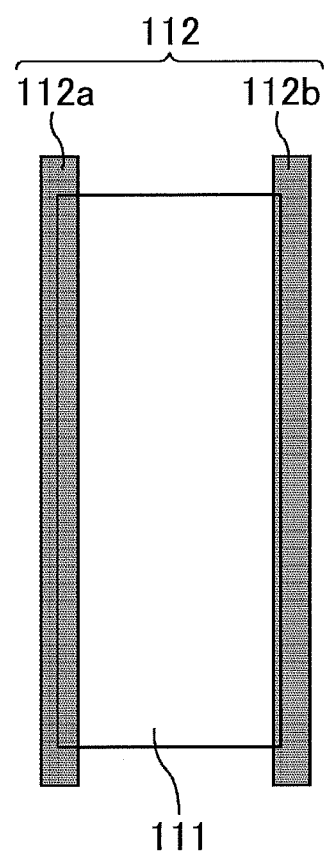
FIG. 26 is a schematic plan view illustrating a positional relationship between source wirings and a pixel electrode when an alignment shift is present in the exposure range.
Figure 27:
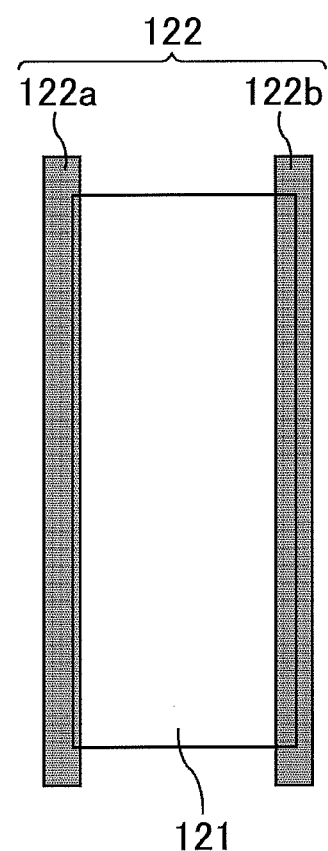
FIG. 27 is a schematic plan view illustrating a positional relationship between source wirings and a pixel electrode when an alignment shift is present in the exposure range.

FIG. 25 is a schematic plan view illustrating a positional relationship between pixel electrodes and source wirings of an active matrix substrate provided in a liquid crystal display device Embodiment 7. Though illustrating an embodiment in accordance with Embodiment 1 now, FIG. 25 may be drawn in accordance with any of Embodiments 2 to 6. The source wirings 12, 22, and 32 are formed to partially overlap with a clearance between two pixel electrodes adjacent to each other in the row direction. The source wirings 12, 22, and 32 each have a bent portion from which a crossing portion is formed. The crossing portions are formed to cross the pixel electrodes 11a, 11b, 21a, 21b, 31a, and 31b. Accordingly, the source wirings 12, 22, and 32 each have a zigzag shape as a whole.

In Embodiment 7, the crossing portions 12c, 22c, 32c, 12f, 22f, and 32f are formed of translucent materials such as Indium Tin Oxide (ITO) and Indium Zinc Oxide (IZO). The first side portions 12a, 22a, 32a, 12d, 22d, and 32d and the second side portions 12b, 12e, 22b, 22e, 32b, and 32e are formed of materials having a low specific resistance such as aluminum (Al), copper (Cu), chromium (Cr), titanium (Ti), tantalum (Ta), and molybdenum (Mo), or nitrides of these, or have a configuration in which layers formed of the above materials are stacked.

At the connecting points between the first and second side portions 12a, 12b, 12d, 12e, 22a, 22b, 22d, 22e, 32a, 32b, 32d, and 32e and the crossing portions 12c, 12f, 22c, 22f, 32c, and 32f, one of the side portion and the crossing portion may be directly stacked on the other, or the side portion and the crossing portion which are formed in different layers via an insulating film are connected through a contact hole in the insulating film.

Such a configuration achieves a higher aperture ratio and hardly causes wiring delay compared to the cases of Embodiments 1 to 6, which provides a liquid crystal display device having more excellent display properties.

The present application claims priority to Patent Application No. 2010-118734 filed in Japan on May 24, 2010 under the Paris Convention and provisions of national law in a designated State, the entire contents of which are hereby incorporated by reference.

REFERENCE SIGNS LIST 1, 2: Substrate
3: Liquid crystal layer
4, 5: Polarizer
6: Liquid crystal molecules
11a, 11b, 21a, 21b, 31a, 31b, 111, 121: Pixel electrode
12, 112a, 112b, 122a, 122b: Source wiring
12a, 12d, 22a, 22d, 32a, 32d: First side portion
12b, 12e, 22b, 22e, 32b, 32e: Second side portion
12c, 12f, 22c, 22f, 32c, 32f: Crossing portion
13a, 13b: Gate wiring
14a, 14b: CS wiring
15a, 15b: Drain wiring
16a, 16b: Contact hole
17a, 17b: TFT
18: Pattern for alignment control (dot)
19: Pattern for alignment control (line)

The invention claimed is:

1. An active matrix substrate comprising:
a plurality of pixel electrodes arranged in a matrix; and
a source wiring running in a column direction, wherein
the source wiring includes first side portions running adjacent to and in parallel with one side in a column direction of each of at least two pixel electrodes of the plurality of pixel electrodes which are aligned with one another in the column direction, crossing portions running across each of the at least two pixel electrodes, and second side portions running adjacent to and in parallel with another side in the column direction of each of the at least two pixel electrodes,
the second side portions being closer to the another sides of each of the at least two pixel electrodes than to the one sides and the first side portions being closer to the one sides of each of the at least two pixel electrodes than to the another sides, and
the first side portions and the second side portions of respective ones of the at least two pixel electrodes are connected to each other via a respective one of the crossing portions.

2. The active matrix substrate according to claim 1, wherein two of the plurality of pixel electrodes which are adjacent to each other in a row direction are of opposite polarity.

3. The active matrix substrate according to claim 1, wherein the at least two pixel electrodes of the plurality of pixel electrodes which are aligned with one another in the column direction includes a pair of pixel electrodes adjacent to each other, the pair of pixel electrodes are of opposite polarity.

4. The active matrix substrate according to claim 1, wherein the at least two pixel electrodes of the plurality of pixel electrodes which are aligned with one another in the column direction includes a pair of pixel electrodes directly adjacent to each other,
the pair of pixel electrodes include a first pixel electrode and a second pixel electrode, and
the second side portion running along the another side of the first pixel electrode in the column direction and the first side portion running along the one side of the second pixel electrode in the column direction are directly connected to each other.

5. The active matrix substrate according to claim 1, wherein the at least two pixel electrodes of the plurality of pixel electrodes which are aligned with one another in the column direction includes a pair of pixel electrodes adjacent to each other,
the pair of pixel electrodes include a first pixel electrode and a second pixel electrode, and
the second side portion running along the another side of the first pixel electrode in the column direction and the first side portion running along the one side of the second pixel electrode in the column direction are not connected to each other via the crossing portions of the pair of pixel electrodes.

6. The active matrix substrate according to claim 1, wherein only one of the crossing portions is provided on each of the at least two pixel electrodes of the plurality of pixel electrodes which are aligned with one another in the column direction.

7. The active matrix substrate according to claim 1, wherein an even number of the crossing portions are provided on each of the at least two pixel electrodes of the plurality of pixel electrodes which are aligned with one another in the column direction.

8. The active matrix substrate according to claim 1, wherein the crossing portions substantially equally divide a side of the plurality of pixel electrodes in the column direction.

9. The active matrix substrate according to claim 1, wherein the crossing portions are transparent electrodes.

10. The active matrix substrate according to claim 1, wherein the at least two pixel electrodes have a rectangular shape.

11. The active matrix substrate according to claim 1, wherein the at least two pixel electrodes have a substantially V shape.

12. The active matrix substrate according to claim 1, wherein the at least two pixel electrodes have a substantially W shape.

13. The active matrix substrate according to claim 1, wherein the first side portions are divided into two branches at a branch point, and the branches respectively overlap with ones of the plurality of pixel electrodes which are adjacent to each other in a row direction.

14. The active matrix substrate according to claim 1, wherein the second side portions are divided into two branches at a branch point, and the branches respectively overlap with ones of the plurality of pixel electrodes which are adjacent to each other in a row direction.

15. The active matrix substrate according to claim 1, wherein the active matrix substrate further includes a gate wiring running in a row direction, and
the gate wiring extends across at least one of the plurality of pixel electrodes.

16. The active matrix substrate according to claim 15, wherein the active matrix substrate further includes a thin film transistor connected to the source wiring and the gate wiring, and
the thin film transistor overlaps with a bisector of a side of at least one of the plurality of pixel electrodes in a row direction.

17. The active matrix substrate according to claim 1,
wherein the active matrix substrate further includes a gate wiring running in a row direction, and
the gate wiring overlaps with a clearance between ones of the plurality of pixel electrodes which are adjacent to each other in the column direction.

18. The active matrix substrate according to claim 17,
wherein the active matrix substrate further includes a thin film transistor connected to the source wiring and the gate wiring, and
the thin film transistor overlaps with a bisector of a side of at least one of the plurality of pixel electrodes in the row direction.

19. A liquid crystal display device comprising
the active matrix substrate according to claim 1, a liquid crystal layer, and a counter substrate stacked in the stated order.

* * * * *